United States Patent [19]

Zenzefilis

[11] 4,388,655
[45] Jun. 14, 1983

[54] METHOD AND APPARATUS FOR RECORDING AND REPRODUCING VIDEO AND SOUND

[76] Inventor: George E. Zenzefilis, 27 Los Vientos, Camarillo, Calif. 93010

[21] Appl. No.: 67,154

[22] Filed: Aug. 16, 1979

Related U.S. Application Data

[63] Continuation of Ser. No. 832,925, Sep. 13, 1977, abandoned.

[51] Int. Cl.³ .................... H04N 5/78; G11B 21/02
[52] U.S. Cl. ............................ 360/19.1; 360/21; 360/107; 360/99; 360/86; 360/97; 360/33.1; 358/343
[58] Field of Search ............... 358/127, 128.5, 128.6; 360/19, 21, 33, 76, 86, 109, 47, 99, 119, 107

[56] References Cited

U.S. PATENT DOCUMENTS

| | | | |
|---|---|---|---|
| 2,712,572 | 7/1955 | Roberts | 360/131 |
| 2,989,595 | 6/1961 | Hunter | 360/21 |
| 3,349,384 | 10/1967 | Kohn | 360/104 |
| 3,384,880 | 5/1968 | Dwinker | 360/97 |
| 3,397,289 | 8/1968 | Pfost | 360/104 |
| 3,500,363 | 3/1970 | Shill | 360/97 |
| 3,649,752 | 3/1972 | Kinjo | 360/97 |
| 3,701,846 | 10/1972 | Zenzefilis | 360/32 |
| 3,825,323 | 7/1974 | Landwer | 358/128 |
| 3,881,188 | 4/1975 | Zenzefilis | 360/97 |
| 3,911,483 | 10/1975 | Kihara | 360/33 |
| 4,015,285 | 3/1977 | Romeas | 358/4 |
| 4,018,984 | 4/1977 | Keizer | 358/128 |

*Primary Examiner*—Alan Faber

[57] ABSTRACT

Apparatus in which a recording transducer is moved along a rotating record medium to develop a series of imprints which are phase-synchronized from track to track. The adjacent tracks are merged with the result that the imprints form a slanted pattern of generally continuous lines extending at an angle to the record tracks.

More than one recording can coexist in the same medium surface by means of utilizing a plurality of such slanted patterns, each of a different slant. For multiple recordings, either a plurality of transducers are used to record and playback, or a single transducer can be used by rotating it to the appropriate orientation.

Sound is recorded in the sync. intervals in the form of samples which form a staggered pattern of their own from track to track, so that only one sound sample may be read out at a time, even when the tracks have been heavily overlapped. Since the sound samples utilize a much smaller portion of the medium surface than the video, there is room in the sync. interval for more than one sound sample. A dither modulation is used to record and read out a higher sound fidelity or a stereophonic rendition or, in general, a multiplicity of sound channels accompanying the video.

Both a damping and also a stiffening method are used to make existing magnetic transducers extremely accurate in the location of the imprints during recording and reading, permitting the omission of clock transitions during recording, which is equivalent of a single side band process for maximum efficiency in medium utilization.

54 Claims, 29 Drawing Figures

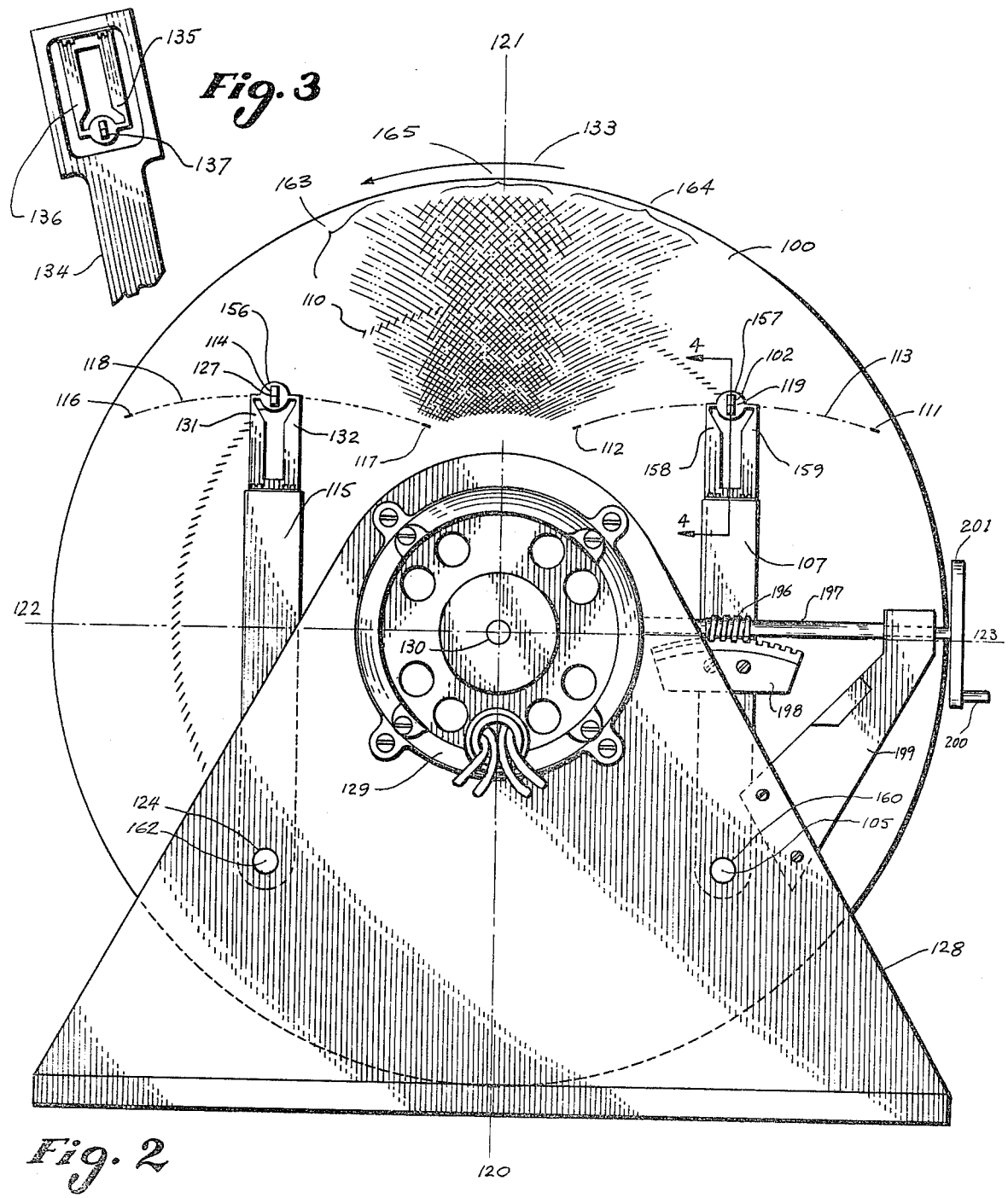
*Fig. 3*
*Fig. 2*
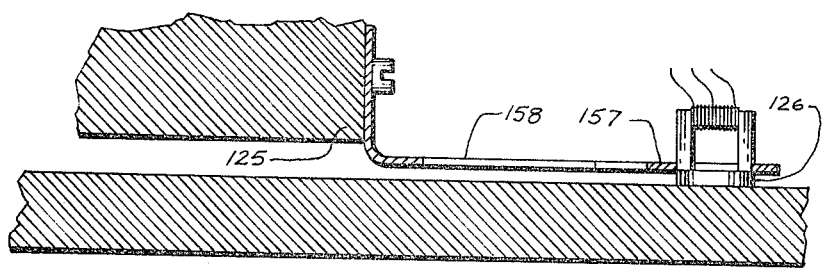
*Fig. 4*

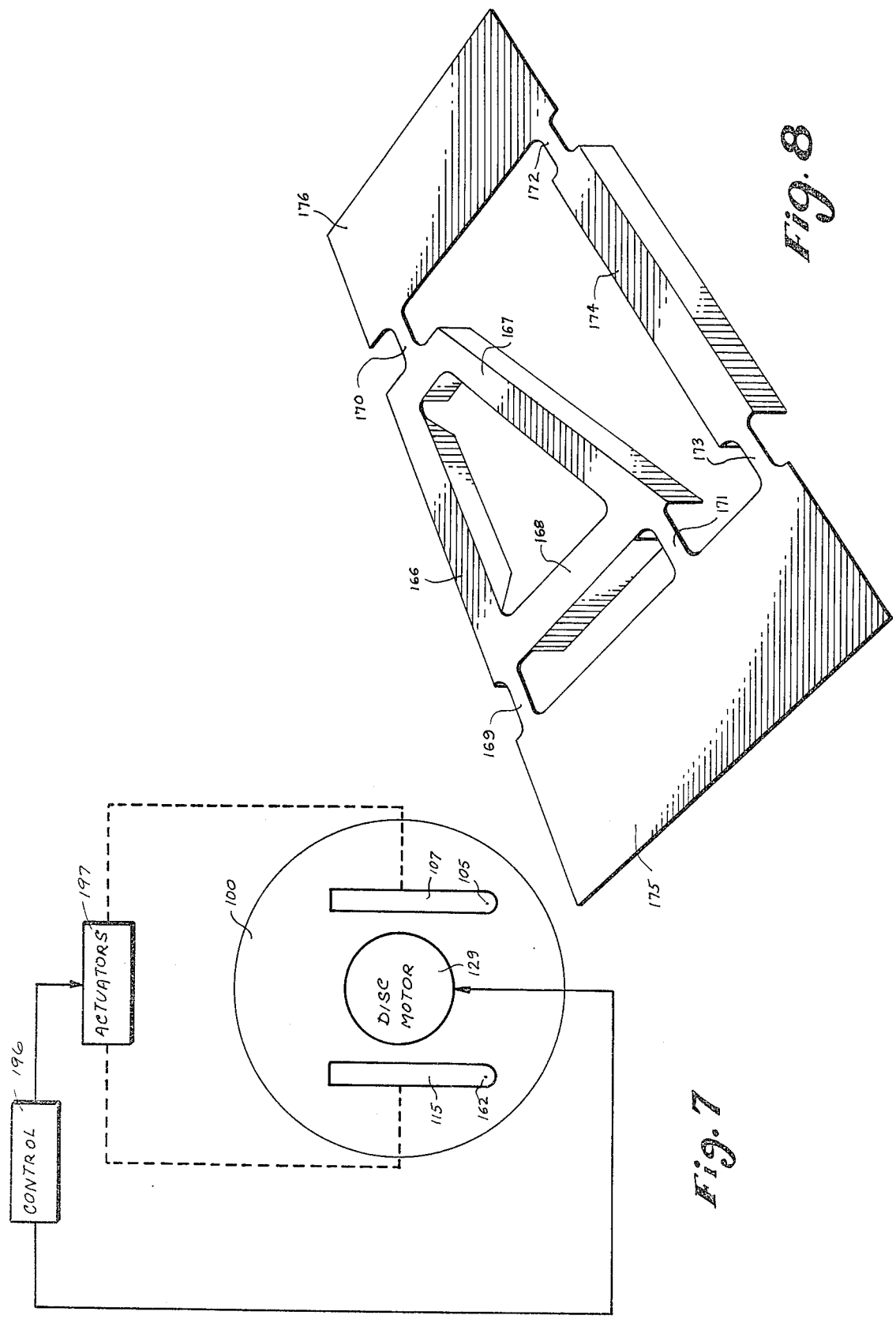

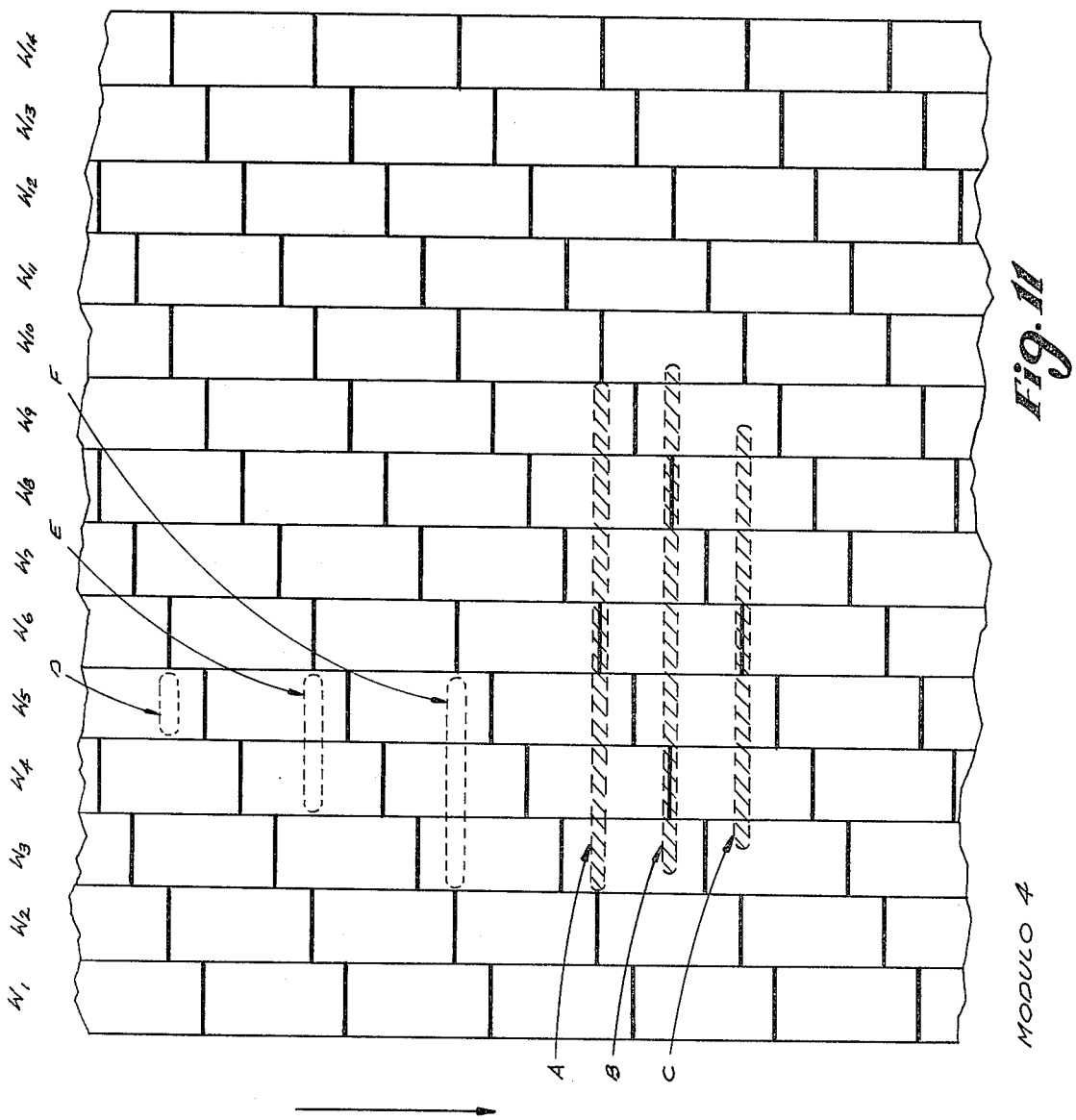

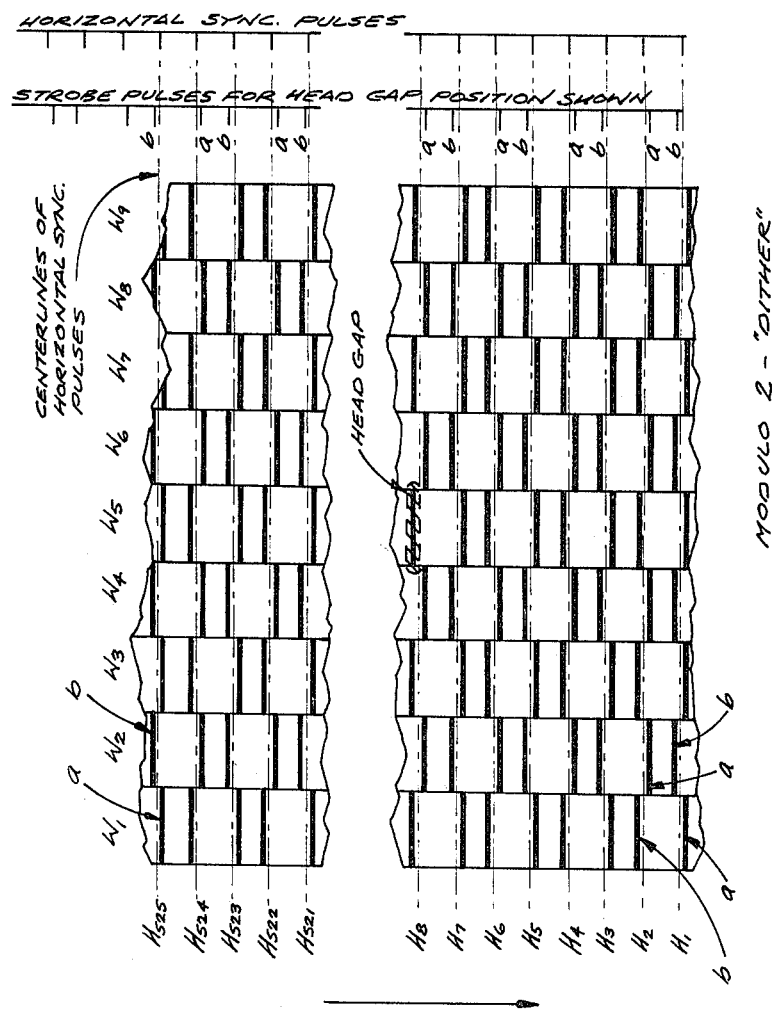

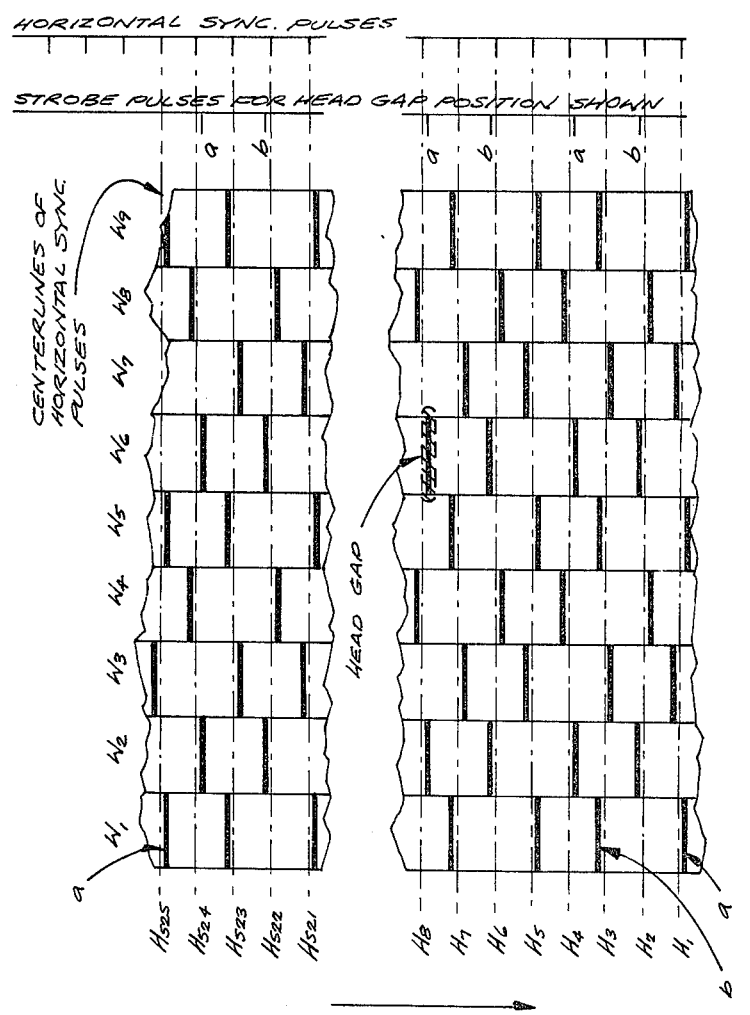

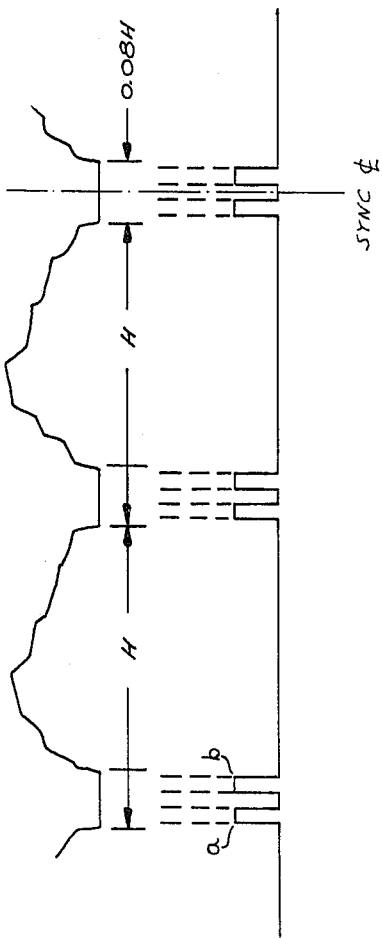
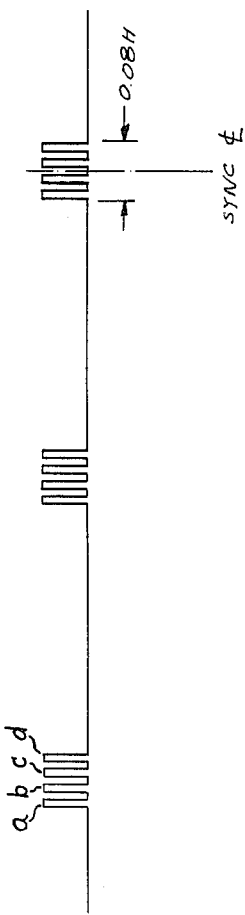
Fig. 17a
Fig. 17b

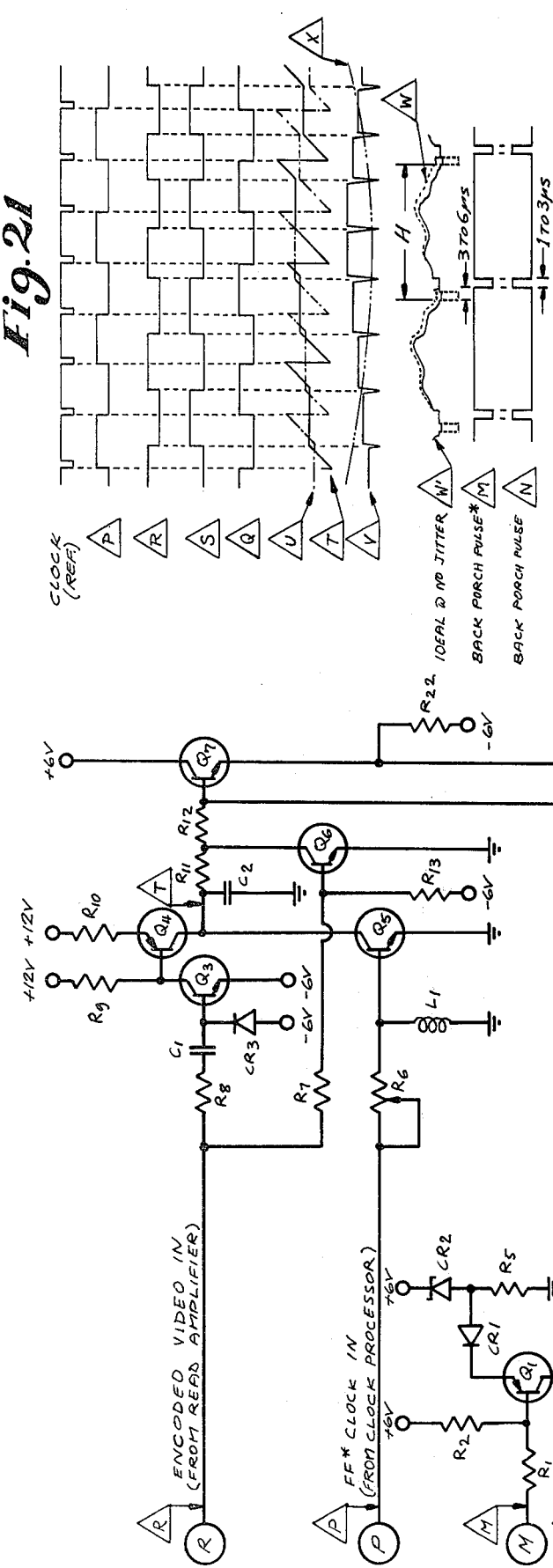
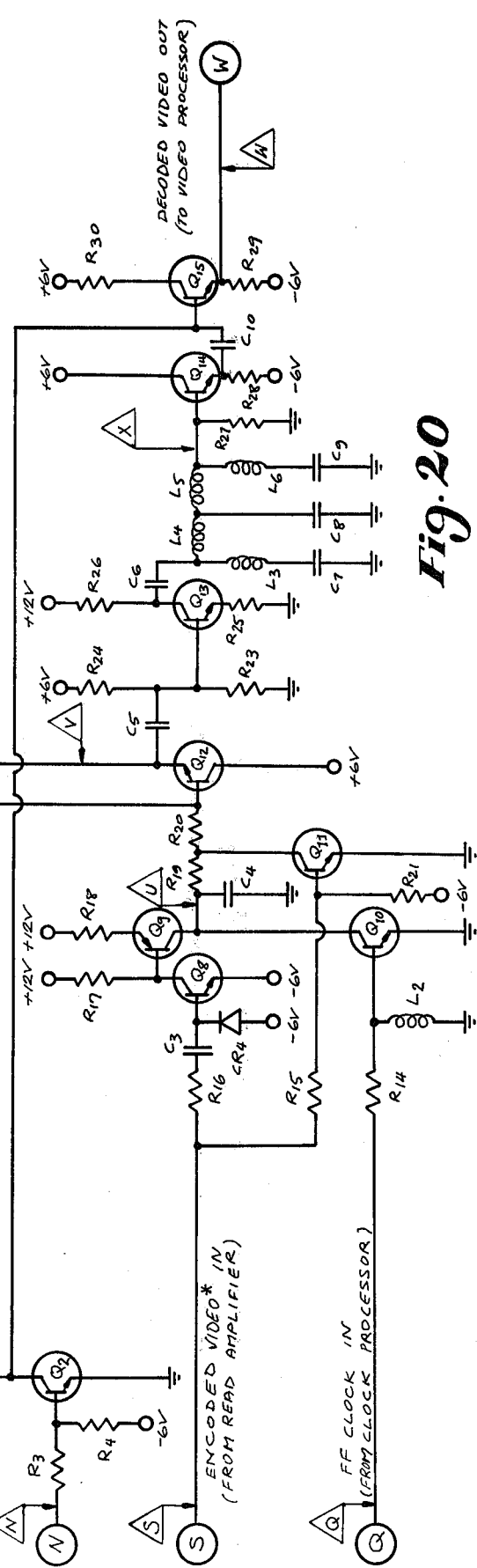
Fig. 21
Fig. 20 VIDEO DECODER

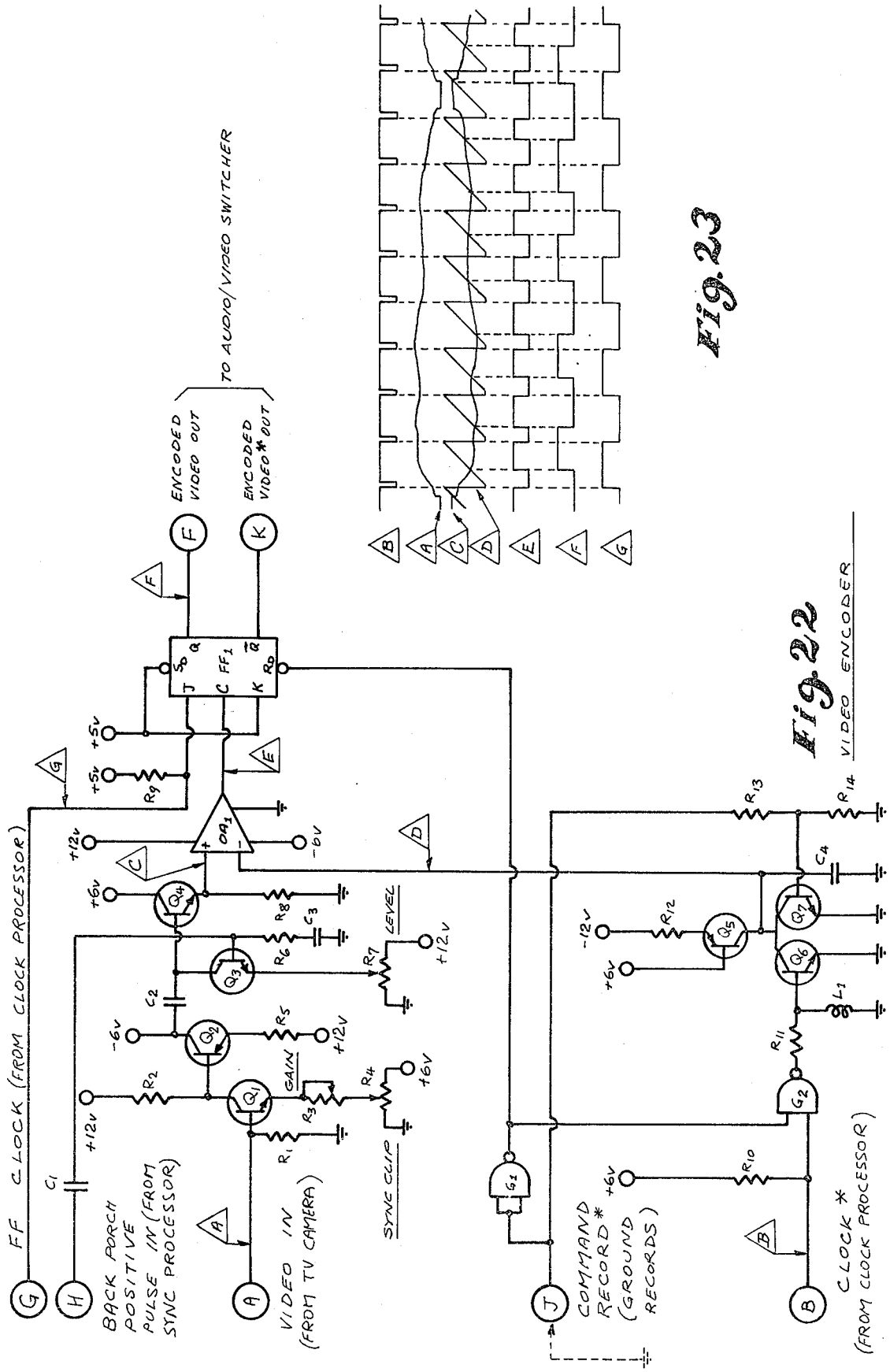

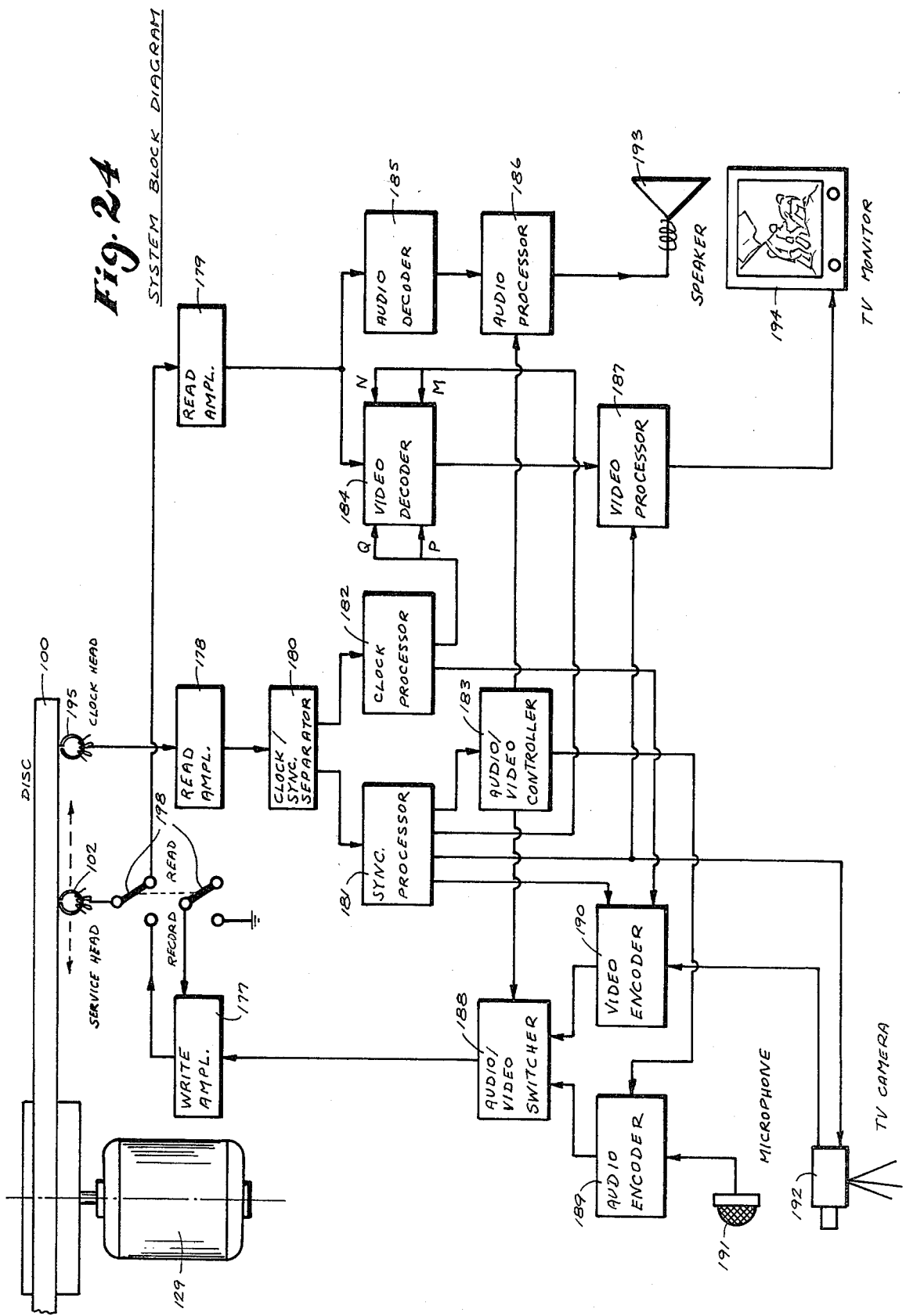

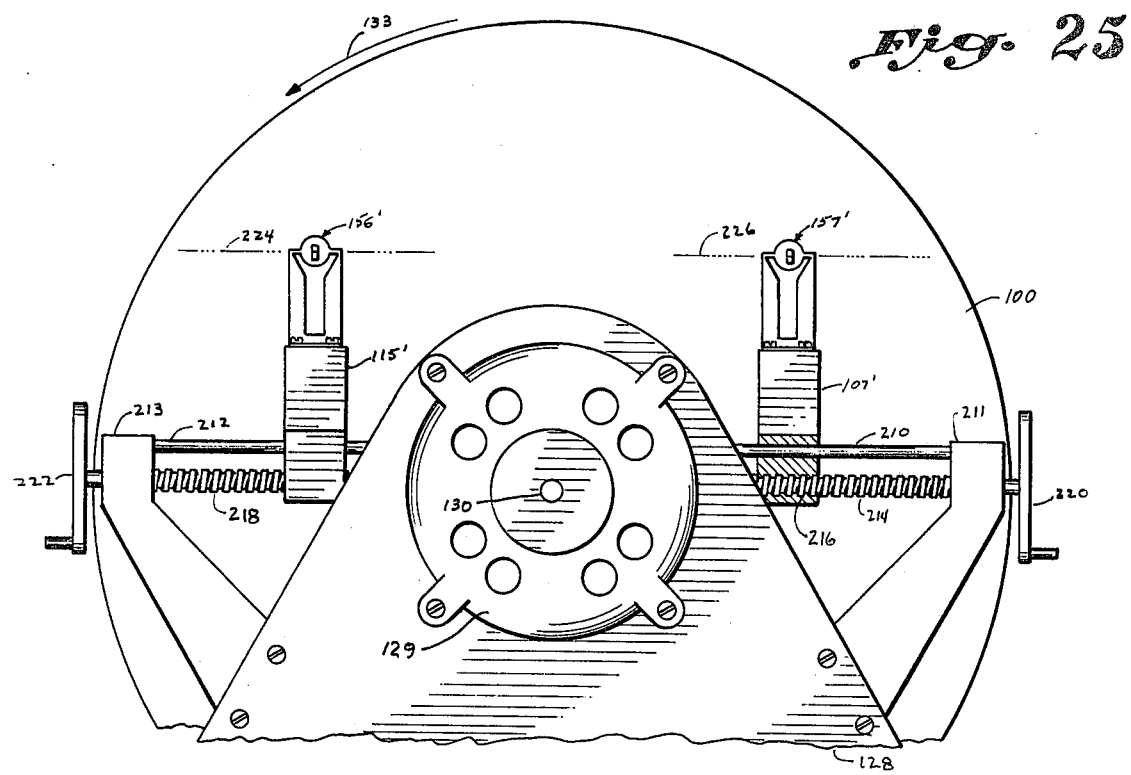
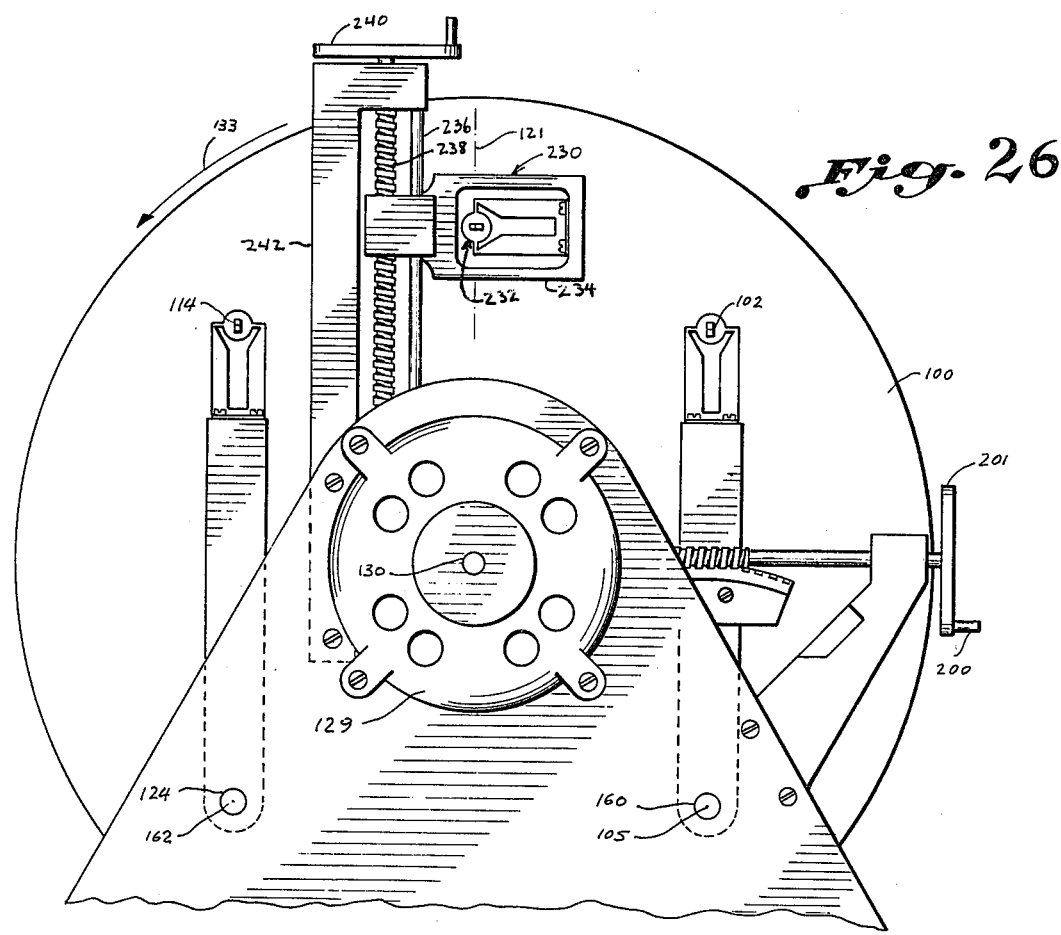

METHOD AND APPARATUS FOR RECORDING AND REPRODUCING VIDEO AND SOUND

This application is a continuation of co-pending application Ser. No. 832,925, filed Sept. 13, 1977, and now abandoned, for METHOD AND APPARATUS FOR RECORDING AND REPRODUCING VIDEO AND SOUND.

CROSS-REFERENCE TO RELATED APPLICATIONS

This application contains subject matter partially in common with the subject matter of my copending applications Ser. Nos. 511,932, filed Oct. 3, 1974, and 729,840, filed Oct. 4, 1976 and now abandoned, both entitled METHOD AND APPARATUS FOR RECORDING AND REPRODUCING VIDEO, the latter being a division of the former.

BACKGROUND OF THE INVENTION

1. Field of the Invention

This invention relates to video recording apparatus and methods and, more particularly, to particular methods and apparatus for improving the density and fidelity of video recording.

2. Description of the Prior Art

Substantial time and effort have been invested in attempts to realize a satisfactory, commercially feasible video recording and playback system. Ideally, such system should be analogous to the cassette type recorders and players available in the audio recording/playback field. In those video recording and playback systems which have been or are now on the market in limited quantities, various types of record media have been employed, such as tapes, tape cassettes, discs, magnetic cards, and the like. Within the broad spectrum of video recording and playback systems is a more specialized segment of the market involving the playback of pre-recorded video programs. In all of the consumer-directed video recording and/or playback systems, it is virtually essential to provide at least 30 minutes of recording time and preferably one hour or more. This presents extreme demands on video recording and playback systems and the associated record media, since a great deal of information must be recorded, requiring very high recording density with significant fidelity.

Disclosures of particular prior art video recording and playback systems of the general type to which the present invention is directed may be found in U.S. Pat. Nos. 3,911,483 of Kihara et al and 3,701,846 of Zenzefilis, the applicant herein. In the system of the latter patent, a specialized type of phase modulation is employed referred to as pulse length code (PLC) or pulse width modulatin (PWM). In the Kihara et al patent, the disclosed system utilizes a more conventional type of phase modulation. In both prior art systems, increased recording density without cross talk is possible through track overlap by virtue of the alignment of corresponding picture elements from track to track at the same relative positions along the tracks. In both systems, the path of the transducer relative to the record medium, considered for simplicity stationary for a moment, is a relatively straight line with movement directed more or less orthogonally to the direction of the tracks. This imposes certain limitations on the recorded information and also requires a very precise drive mechanism for relative transducer movement. One of the problems encountered heretofore in recording systems of the type referred to above as well as those of more general application, such as in digital recordings in computer peripheral systems and the like, has been a certain inherent longitudinal motion of the recording and reproducing transducers known as "head jitter". This imposes a requirement for providing certain minimum positional tolerances for the service and clock transducers in order to prevent improper phase information developing from unacceptable relative displacement of those transducers.

Although increased density in video recording may be achieved by developing track overlap with reproduction by transducers scanning more than one track simultaneously in the manner followed by the systems of the above cited patents without objectionable cross talk, the accompanying sound recording cannot be treated the same way because of differences in the video and sound information content and in the respective perception functions. The cited Zenzefilis patent discloses a sound recording technique which is directed to obviating the problem of cross talk in overlapping sound tracks. In the disclosed system, as an example, only every fourth sync. interval is modulated with audio. While this solves the problem described to some extent and permits playback without objectionable cross talk for transducers overlapping tracks to a certain degree, it still imposes a limitation with respect to the extent of track overlap that is permissible for a given transducer-to-track width ratio, and also a limitation of the upper frequency response of the sound reproduction.

It is, therefore a general object of the present invention to provide improvements in previously known video-with-sound recording systems which achieve enhanced operational performance with increased recording density, reliability, simplicity, and fidelity.

SUMMARY OF THE INVENTION

In brief, methods and apparatus embodying the present invention involve the mounting of the service transducer(s) for movement along a smooth curve, not limited to the straight line path of prior art systems exemplified by the patents cited above. These methods and apparatus permit the superposition of recorded information, thus allowing increased recording density and providing other benefits as will be seen. Provision is also made for obviating the limitations described above with respect to sound recording in combination with video and two particular mounting arrangements for the transducers are directed to control their movement more precisely, this also contributing to the reliability of operation with increased recording density of the system.

A disc, or a drum, or a tape, the latter scanned in its short dimension, is locked in synchronism with a television camera by means of a sync. track, real or derived, and by means of clock information produced by a separate, or also derived, track, records both video and sound information magnetically, optically, or otherwise, with the same transducer or plurality of transducers. The media, or the transducers especially in the case of tape, rotate at 1800 RPM when both fields of each picture frame are recorded in one revolution, or at 3600 RPM when the odd fields are recorded in one locality and the others elsewhere (or not at all for the cases of "skip field" recording).

The innovative power of the system is in transforming the usually recorded tracks into a new pattern of long imprints, which form, in general, continuous lines equal in number to the elements of the clock track and also with one-to-one correspondence with them. All lines of this pattern, which I call "elemental," form a substantial angle to the direction of the tracks that the transducer would record in an ordinary system; this angle is 90 degrees at the upper extreme and ranges as small as, say, 15 degrees. Each of the lines of the elemental pattern contains the complete history in terms of brightness and color of one picture element, rigidly defined in terms of the display screen's Cartesian coordinates, from the time the recording begins until the time it ends. Hence, during playback the reading transducer can be positioned any place in the medium, without any requirements in accuracy as to the track registration since there are no longer any tracks, as such, and can move at any speed for the rendition required: stopped, for still images; very slowly, for slow motion; at rated speed, for real time playback; or even in jumps from one location to another, for special effects.

In systems in accordance with the present invention, the path of relative movement of the service transducer, which I define as the "transducer's progress path," may or may not be a straight line. If it is a straight line, it need not pass through the center of the disc. If not a straight line, it can be any other smooth curve, such as a parabola, an ellipse, or even a circle, none of which need to be orthogonal to the record tracks. In particular, one preferred path of relative movement of the transducer is a logarithmic spiral, for the reason that such a curve has the property of intercepting all radii with the same angle. Where a straight line path which does not pass through the center of rotation of the disc is provided, the orientation tolerances are relaxed. Where a circular path is employed, a less expensive mechanism, such as a swinging lever, may be used to propel the head, rather than the sliding carriage mechanism of the cited prior art. Where a slanted path is employed, that is, any path in which the transducer's gap forms a substantial angle with the disc radius, the effective track width is substantially reduced, specifically by a factor equal to the cosine of the angle.

By choosing a transducer's progress path in this fashion, i.e. such that the transducer gap forms a substantial angle with the disc radius, recording techniques such as are disclosed in U.S. Pat. Nos. 2,712,572 of Roberts and 2,989,595 of Hunter may be employed to provide superimposed recordings with the result that the playing capacity of the disc can be increased by a factor of two or considerably more. In arrangements in accordance with this aspect of the invention, more than one recording can coexist in the same medium surface by means of utilizing a plurality of such slanted elemental patterns, each of a different slant. Thus, for example, one recording could be slanted at $-45°$ from the orthogonal to the tracks, and a second at $+45°$. In the case of multiple recordings, either a plurality of transducers are used to record and playback, each processing its one elemental pattern and ignoring those produced by the other transducers which are at substantially different orientations, or a single transducer can be used by rotating it to the appropriate orientation. In accordance with this aspect of the invention, where color video is being processed, the television signal can advantageously be separated into its constituent parts, either the three red-green-blue components or the usual two difference signals plus luminance, thus permitting a more faithful recording and reproduction of video, since each of the constituent colors can be recorded in its entirety (without any additional encoding schemes which reduce the resolution of color). Further in accordance with this aspect of the invention, some of the coexisting recordings may be dedicated for sound, either partly or entirely, or for other signals such as transducer progress motor control information, etc.

Each slanted elemental pattern is formed by sampling the TV camera's output at time intervals corresponding to the clock track elements and recording all resulting imprints by means of P.P.m. or Ph. M., with the clock element boundaries used either as a reference or as a carrier correspondingly. Thus, the TV image frames are themselves automatically analyzed into a number of picture elements, each corresponding to one clock element, and each picture element is placed into a preassigned general angular position for discs or drums, or into a preassigned athwart position in the case of belts or tapes. The exact location of every such imprint varies according to the position of the transducer on its progress path at the instant of recording and also according to the degree of the brightness and color of the corresponding picture element of the image issued by the TV camera; however, the excursions from the nominal position, or "preassigned" by virtue of the rigidly established transducer's path, of each picture element's imprint resulting from the variations of brightness or color, from rotation to rotation, can approach, but not exceed, the interval between two clock elements in that vicinity.

When using uniformly spaced clock marks, or other very simply varying clock densities, no clock track is needed if the disc rotates very uniformly as when its speed is servo-controlled and if an index mark is available on the rotating assembly. In such cases a derived, or artificial, clock track can be obtained by employing an oscillator controlled by suitable guiding circuitry, so that its pulses are properly spaced for each and every disc rotation. Suitable circuitry for this purpose is, for example, what is known as a phase locked loop.

The clock elements, or marks, need not be uniformly spaced on the other hand, but they may be irregularly positioned, either randomly or with a specific rule.

During recording the tracks are always overlapped, sometimes slightly to ensure at least merging of the recorded imprints, or more heavily to economize on the medium's surface in cases where scenes contain little motion or time change. Whether the medium employs magnetization, or opacity, or any other physical state property for recording, a digital and binary method is preferred for purposes of high resolution, such as opacity or no opacity, positive or negative magnetization, etc. Therefore in recording the picture elements, the imprints created are merely the boundaries, or transitions, between the two states; and since every element is preassigned to coincide with a particular transducer's progress path, precisely so in the absence of light or color variations from the nominal value, or almost so and in fact within a clock period if such variations take place, and since care is also taken to ensure the element's binary polarity beforehand, all tracks disappear and all imprints merge.

Preferred arrangements in accordance with the present invention provide an improvement of sound recording in conjunction with video by means of a repetitive shift in the position of the recorded sound samples by means of what I refer to as a "dither" modulation. As in the prior art system of Zenzefilis mentioned above, the audio is recorded in the sync. interval between succeeding horizontal scan line portions of the video. In accordance with an aspect of the present invention, each horizontal sync. interval is divided into two available positions, the first occurring somewhat before the centerline of the interval and the other slightly after. By virtue of the dither modulation scheme, the audio recording alternates in the choice of these two positions per sync. interval so that there is at least one audio recorded sample in each horizontal sync. interval. Since the number of horizontal sync. intervals (525) is odd, the positions for recording audio are staggered from track to track. Thus, there can be overlap of the reproducing head with respect to the elemental tracks without cross talk between the sound recorded on adjacent elemental tracks by virtue of this dither modulation.

The term "elemental track" is defined as the circular, or cylindrical, or otherwise, set of intact imprints having escaped the overlap after one succeeding revolution during recording.

An electrical means for achieving the same effect as in shifting the service head laterally by one elemental track each time is also presented, whereby there can be still heavier overlap than as stated above, with high probability of detecting two sound samples simultaneously. The circuit in such instances corrects the errors almost instantaneously. Since the sound samples utilize a much smaller portion of the medium surface than the video, there is room in the sync. interval for more than one sound sample. Hence, a dither or even a strumming modulation is used to record and read out a higher sound fidelity or a stereophonic rendition or, in general, a multiplicity of sound channels accompanying the video. I define further the term "strumming" as the the case when more than two sound samples are used in the sync. interval. These samples are selected by a prearranged cyclical rhythm both in recording and also in reading.

In particular arrangements in accordance with the present invention, a particular suspension of the service and clock transducers is provided to eliminate longitudinal motion thereof known as "head jitter". With the elimination of such motion, a very precise positioning of every magnetic imprint in relation to the clock timing pulses is accomplished during recording. Thus, the clock transitions can be eliminated during recording and can be reinstated during playback. With the elimination of the clock transitions in accordance with this aspect of the invention, the longitudinal density of recording may be improved by a factor of two. This process is equivalent to the elimination of one-half the frequency bandwidth in the case of single side band frequency modulation or phase modulation schemes. The jitter-free transitions thus provided readily permit trade-off between disc area and picture resolution. Thus, by using two tracks and two heads for each frame, instead of one each, it is possible to double the image resolution by multiplexing the transitions so that odd transitions are recorded by one head in one location and even transitions are recorded by another head in a different location. This permits the recording of images of twice as many elements without exceeding the maximum linear density of the system. The respective transducers may be arranged so that one is operative with the radially outward portion of the disc surface, while the other transducer is operative with the radially inward portion of the surface. In another arrangement, one transducer may be arranged to process the upper surface of the disc while the other transducer operates with the lower surface. A combination of these two possibilities permits a quadrupling of the resolution possible from the use of only a single transducer.

I have found that the above-mentioned head jitter results from the resilient support mechanism of the transducer vibrating generally in a compound mode, such as is encountered in a vibrating bar which is supported simply or by clamping at both ends. In one particular arrangement of the present invention, a transducer support mechanism is provided which utilizes a length of ordinary wire touching the leaf spring support member in a way which damps these vibrations and eliminates head jitter. Also presented is a method of making the transducer pivoting member, or members, very rigid, and this in turn raises the natural oscillation frequency to a value much higher than the forcing disturbances existing in the system. This method removes the head jitter just as well as the previously described damping approach.

In the preferred embodiment of this invention, magnetic discs of about 14 inch diameter and magnetic heads approximately 0.8 mil in track width are used. Such discs can easily record and adequately playback one hour of continuous TV programming, with sound and in color.

Video is recorded by PLC as described in my U.S. Pat. No. 3,701,846, while the sound is recorded by Random Pulse Length Coding which is described in my U.S. Pat. No. 3,881,188. The sound is recorded differently because its code requires no clock and is immune to speed variations, while still offering the same efficiency as the code used for video. This immunity somewhat penalizes the highest sound frequencies in the sense that it makes it difficult to perfectly optimize the filter following the sampling acquisition process during playback; it is quite acceptable, however, at this stage of the television art, because the emphasis in fidelity is on the picture not the sound. If more sound fidelity is needed, the method can still accommodate it, because, as I have stated earlier, there is plenty of room in the sync. interval.

BRIEF DESCRIPTION OF THE DRAWINGS

A better understanding of the present invention may be had from a consideration of the following detailed description taken in conjunction with the accompanying drawings, in which:

FIG. 2 is a plan view of one particular arrangement in accordance with the present invention. Here the two levers are shown and also an area, near the top of the disc, illustrating the intersection of two elemental and co-existing patterns, one recorded by a head mounted on one lever and the other by a similar head on a lever propelled by a hand crank arrangement.

FIG. 3 is a view of a portion of the arrangement of FIG. 2 showing an alternative orientation of the left hand transducer;

FIG. 4 is a sectional view of the right hand transducer of FIG. 2 taken along the section 4—4 thereof;

FIG. 7 is a block diagram relating the mechanical motion of the transducers with their controlling mechanism. Also shown is a motor control path for cases where the disc rotation is controlled by a servo mechanism;

FIG. 8 is a perspective drawing of another form of a transducer specification in which the pivoting arms are rigid instead of being flexible;

FIG. 11 is a diagram similar to FIG. 9, also for modulo 4 operation, but with electrical correction;

FIG. 15 is a greatly expanded diagram showing the sound samples for modulo 2-dither;

FIG. 16 is a greatly expanded diagram showing the sound samples for modulo 4-dither;

FIG. 17a is a waveform diagram illustrating the time relationship between the strobing dither pulses and the horizontal sync. pulses;

FIG. 17b is a waveform diagram illustrating the time relationship between the strobing strumming pulses and the horizontal sync. pulses;

FIG. 20 is a schematic diagram of one embodiment of the video decoder;

FIG. 21 is a diagram of some important waveforms of the video decoder of FIG. 20;

FIG. 22 is a schematic diagram of one embodiment of the video encoder;

FIG. 23 is a diagram of some important waveforms of the video encoder shown in FIG. 22;

FIG. 24 is an overall system block diagram showing the various signal paths and other interconnections;

FIG. 25 is a plan view, similar to FIG. 2, showing an alternative embodiment providing for superimposed recording by movement of transducers along linear paths; and FIG. 26 is a plan view showing a modification of the arrangement of FIG. 2 to incorporate a third transducer driven along a radius of the disc.

DESCRIPTION OF THE PREFERRED EMBODIMENTS

Introduction

Figure 1:
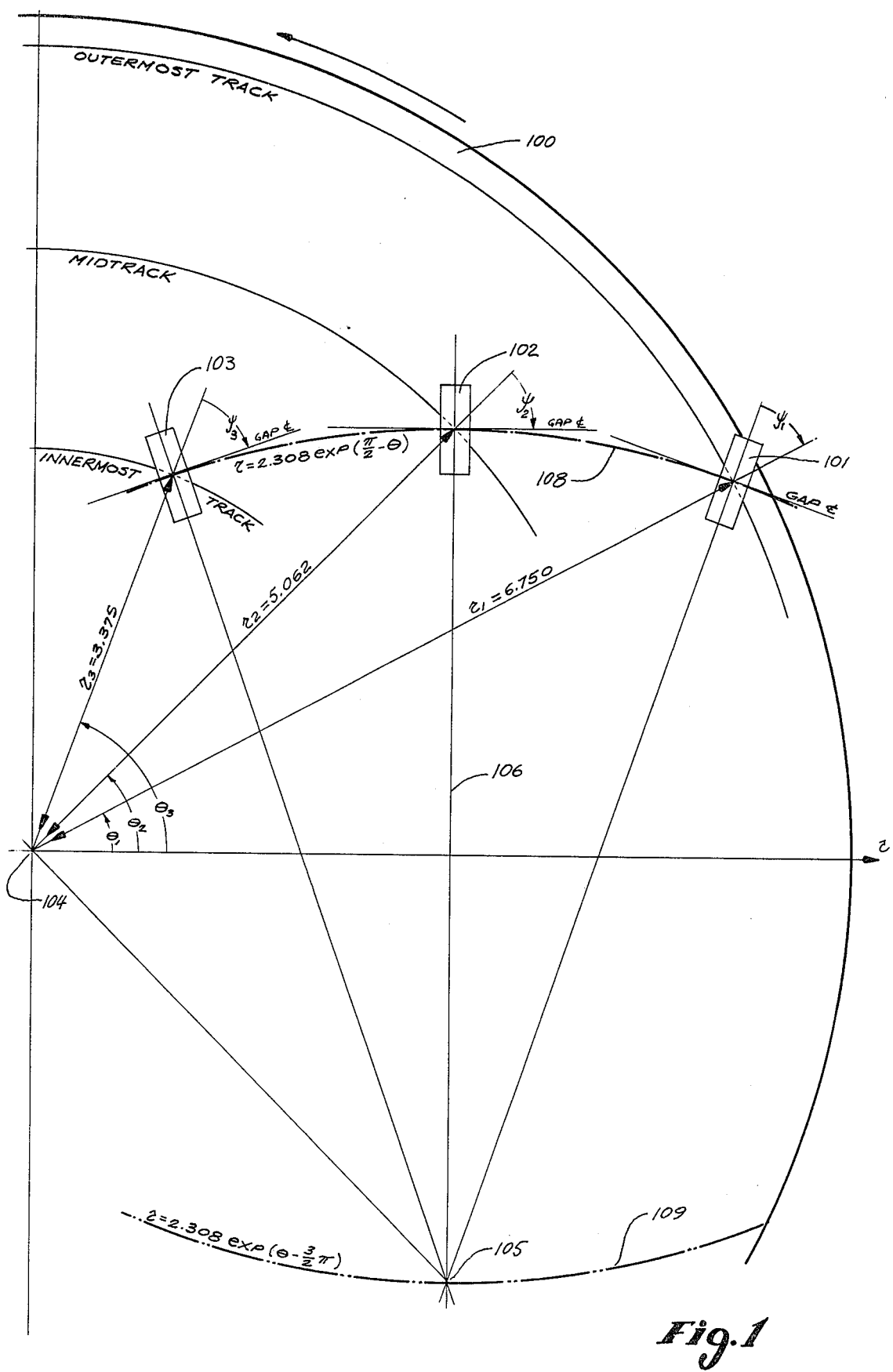
FIG. 1 is a schematic diagram showing the two logarithmic spirals, conjugate to each other, and also the centers of the circles which simulate them.

This invention is a continuation and an improvement of the method and apparatus described in my U.S. Pat. No. 3,701,846. It is also meant to be a continuation and a technical improvement of another U.S. patent application filed on Oct. 3, 1974 under Ser. No. 511,932, which itself derives from the application of the above mentioned patent.

In this specification four major types of improvements will be described: improvements concerning the transducer's progress path, augmentation of recording capacity by superimposed recordings, elimination of head jitter, and increase of sound capacity and fidelity.

3. A. Transducer's Progress Path.

The service transducer moves in a more general way following a smooth curve which, unlike U.S. Pat. No. 3,701,846, may or may not be a straight line. For example, if the path is a straight line, it does not have to pass through the center of the disc. If it is not a straight line, it can be any other smooth curve, such as a parabola, or an ellipse, or even a circle, none of which need be orthogonal to the elemental tracks. In particular, a preferred curve is a logarithmic spiral, because it has the property of intercepting all radii with the same angle, and can also be simulated by a circle within a practical range.

The advantage of using a straight line path which does not pass through the disc's center of rotation is that the orientation tolerances are relaxed. On the other hand, when using a circular path, the head may be propelled by mechanisms less expensive than a sliding carriage, such as a swinging lever. As for the other curves, they may have advantages of their own. An additional advantage of using a slanted path, that is any path on which the transducer's gap forms a substantial angle with the disc's radius, is that the effective track width is greatly reduced, and in fact, by a factor equal to the cosine of this angle. This is so because a track, recorded for illustration with no overlap, has a radial width equal to the projection of the head's gap on the disc radius at that point.

B. Superimposed Recordings.

If a path is chosen so that the transducer does form a substantial angle with the disc's radius, usage of Roberts' U.S. Pat. No. 2,712,572 and Hunter's U.S. Pat. No. 2,989,595 can be made, and thus the playing capacity of the disc can be increased by a factor of two or more, because a number of coexisting recordings can be made one on top of the other, each processed by one transducer having appropriate orientation and ignored by transducers having substantially different orientations. A further advantage in multiple recordings is that in the case of color, the TV signal can be separated into its constituent parts, either the three red-green-blue, or the two color difference signals plus luminance, thus permitting a more faithful recording and reproduction since each of the constituent signals can be recorded in its entirety and without any additional encoding process which invariably introduces losses of efficiency and signal-to-noise ratio. Yet another advantage is that some of the coexisting recordings can be dedicated for sound, either partly or entirely, for multilingual or stereophonic renditions, for special effects, or for other signals.

C. Head Jitter.

A very important innovation in the herein described invention is the suspension arrangement of the service and clock transducers to eliminate their longitudinal motion known as "head jitter." The advantage of eliminating these motions is that a very precise positioning of every magnetic imprint in relation to the clock imprints is accomplished during recording. Thus, the clocking transitions can be eliminated during recording and can be reinstated when needed by the decoder in the playback action, since the transducers will be equally accurate during this action as well. The elimination of the clock transitions improves the longitudinal picture element density by a factor of two and is equivalent to the elimination of one-half the frequency bandwidth in the case of single sideband F.M. or Ph.M. codes.

As I state in my copending patent application 511,932, page 16, l. 16:

> On the other hand, it has proved much easier to playback discs on which both boundaries have been preserved, because the information carried by the clock track is not needed and thus the unavoidable minute displacements of the clock track transitions in relation to the transitions in the main disc surface due either to the flange diameter tolerances when replacing the disc, or to replicating distortions, are ignored.

The above statement shows the existing difficulties of that time. It was found subsequently that the jitter of the transducers causes the most serious difficulty. Now, with the new suspension, the jitter has been completely eliminated and maximum longitudinal packing density along the tracks is realizable.

In addition to the above, jitter-free transitions readily permit an exchange between disc area and picture resolution. Thus, by using two elemental tracks and two heads for each frame, instead of one, we can double the image resolution by multiplexing all recorded imprints so that the odd ones are recorded by one head in one location and the even ones by the other in another location; hence, we could record images of twice as many elements without exceeding the maximum linear density of the system. Of course, both heads will be recording and also reading a good number of elemental tracks, which requires such possible arrangements as devoting the outer disc's surface to one head, and the inner to another. Alternatively, one head could be arranged to process the disc's top surface and the other the bottom. This process of multiplexing can be extended further for still better resolutions; thus four heads used simultaneously will quadruple the image resolution.

D. Sound.

This invention also presents an improvement in sound recording in, which, instead of using analog registers to increase the number of stored samples as described in column 10, line 58 of U.S. Pat. No. 3,701,846, a novel dither-type of modulation is used. The advantage of this is the simplification of circuitry. Another dominant advantage is that by a substantial increase in the number of stored sound samples, we can have stereophonic rendition, two language recordings, etc. However, it must be borne in mind that without such registers, the theoretically highest sound frequency that can be reproduced will still be limited to 7,875 Hz since the disc rotates at 30 RPS and, with 525 synchronization intervals, the highest reproducible frequency cannot exceed one-half the sampling rate.

More Details (A) FIG. 2 shows the major mechanical parts of one embodiment of this invention encompassing a magnetic disc 100 and two levers 107 and 115, each holding a magnetic read/write head. A simple example will illustrate how the system works and at the same time how track overlapping is used. For simplicity lever 107 is equipped with a worm gear sector 198 engaging a worm 196. The worm shaft 197 is supported by two bearing means, one of which is incorporated in bracket 199 and the other is not shown as it is behind the disc motor 129, and is free to rotate under the action of handcrank 200 which the user of the system operates. There are two important requirements for the formation of an elemental pattern by transducer 102: That its gap be oriented so that it is always tangent to its path 113, and that tracks recorded from disc rotation to rotation are at least contiguous. To ensure the last condition handwheel 201 will not be rotated faster than the speed just separating the recorded tracks. As an illustration, assume that motor 129 is of the hysteresis synchronous type and that it rotates the disc at 1800 RPM. It will be shown later that path 113 approximates closely a logarithmic spiral intersecting all disc radii at 45° if at the midtrack position the lever is vertical, as shown, if the center of the distance between the head's gap 119 and center 105 falls on the axis 122-123, and if the location of center 105 is itself on a radial line 45° from the axis 122-123. Assume further that the head gap's width is 0.833 mil. Since its orientation is 45° from the radius, the recorded tracks (with no overlap) have width h=0.589 mil. Assume now that the worm's pitch is such that in one rotation it moves the head by 25 mil tangentially to the circle 113. Hence, the angular handwheel velocity making two consecutive tracks just contiguous is $(0.833/25) \times 60 \times 30 \simeq 60$ RPM. In order to illustrate in a dramatic way how simple but powerful the concept is, let us assume that the handcrank is rotated by an average person when the recording is made. Furthermore, assume that this user, in order to ensure overlap, rotates the handcrank at 48 RPM instead of 60, thus overlapping all tracks by 20% in the sense that on every disc rotation the transducer is advanced by 80% of its gap length. In addition, the user has the flexibility of slowing down the cranking during scenes of slow action to economize on the disc area and so proportionally increase the playing time, and of speeding it up to preserve fidelity in time resolution. Even though this recording fashion may appear strange and reminiscent of the times of organ grinding, the results are indeed quite satisfactory. More specifically, the user may increase the handcrank's rotation rate by as much as 25% above the original, whereby the tracks recorded will become just contiguous but still not separate; and he may decrease the rate with virtually no limitation, but bearing in mind that the economy achieved will be at the expense of increasing the motion blur of the overall rendition.

During playback, the user also rotates the handcrank, but now there are not restrictions to his increasing or decreasing the rate; he may turn slowly, or even stop, to observe some scenes at leisure, or he may turn the crank furiously fast if he wants to move rapidly to other program portions. Naturally, if he wants to playback at real time rate, he should rotate the handcrank at the same speed as when recording. A suprising effect during slow motion renditions is that sound emerges with the same pitch as the original, unlike the sound recorders commonly is usage. This is due to the fact that the disc rotates constantly at the same velocity.

The success of the method lies in the fact that the recorded imprints have all been lined up from track to track in such a way that they merge into a pattern of smooth curves, all having a new orientation substantially different from that of the tracks. The new orientation is that of the transducer's gap at the various radii, where imprints, which are defined as magnetization boundaries between picture elements, are formed. Care is taken here to form the same magnetization between corresponding elements from track to track, as it will be shown in the description of the Encoder, so that the tracks as such disappear. More explicitly, the tracks are replaced by the boundaries of these elements, which themselves are merged and form boundaries of long extensions of the same magnetization state spanning all the elemental tracks. Having eliminated the tracks in this way, there is no longer any difficulty in the transverse transducer positioning during playback.

Of course, in the scene areas where we have rapid changes in time, the elements form elemental track to elemental track cannot possibly line up, and during playback the system produces a blur. But this type of blur is expected because the human eye itself has a time response of about 1/15 second, equivalent to the time interval between three elemental tracks, i.e., twice the time interval between frames: therefore the additional smear is of the same order of magnitude as the one expected in a conventional TV recorder. More specifically, referring to the example of U.S. Pat. No. 3,701,846, column 3, line 16, where we have a rapidly running horse, let us assume that one elemental track has recorded his foreleg up and the next track the same leg down. The elements corresponding to the foreleg in these two elemental tracks cannot possibly match with each other because they contain gross variations of brightness. If now we assume further that during playback the transducer (the same as the one used during recording or another one) finds itself straddling these two elemental tracks equally, which is the case producing the worst blurring effect, the result is a blur connecting the two leg positions. Since in the United States system, the time interval between consecutive tracks is 1/30th of a second, and since, as stated, the eye's response is 1/15th of second, the additional blur will be hardly noticed.

From all that has been said already it should be clear that the head can be moved by a variety of prime movers during the action of recording. For example, an ordinary stepping motor could be used which would move the transducer one or more steps for each revolution. Since at least a slight overlap is always desired, such steps will have no significant effect in comparison with a continuous motion motor, as the net result will always be the transformation of the tracks into the elemental pattern. Considering that it is also desirable to overlap heavily when recording scenes of little motion content, motors capable of several steps per disc revolution are preferred.

Alternatively, a continuous motion motor can be employed as the transducer's prime mover, having the capability of moving the head rapidly for fast scenes or slowly for scenes of little action. Such a motor could be of the A-C induction type, or it could be of D-C type, since both are speed controllable.

In practice the overlap during recording can range from about 20% to about 83.3%, in the sense that the first number corresponds to elemental tracks being 80% as wide as the transducer which recorded them and the second number to elemental tracks being 16.7% as wide (tracks and heads are measured either both radially or both in the gap direction, and in both cases the resulting percentage number is the same). Occasionally, the overlap may reach values as high as 96.67% for particularly slow-moving scenes, implying that there the recording head is 30 times wider than the resulting elemental tracks. This stratagem of continuously varying the overlap extends the overall playing time by a factor of about 3 for the usual TV programs, when compared with the case of having no overlap at all.

The reader should be reminded that the disc always rotates at a constant speed which is determined by the TV standards of the applicable country (1800 RPM in the U.S.A. and 1500 RPM in Europe); this is also precisely the speed at which a 4-pole synchronous motor rotates when connected to the household mains. Or at double the above speed for skip-field recordings as mentioned earlier.

In the process of constructing a number of such recording machines, as encompassed by the herein invention, it was found that due to machining tolerances head carriages could never be precisely adjusted so that the transducer gap be exactly radial for cases where the transducer progress path is a straight line. But it is not necessary for the imprints to be radial: indeed, any orientation will suffice, if the conditions for achieving elemental patterns are met. This is so because the decoding process, during playback is essentially a timing process; brightness is reproduced by measuring intervals from the time a clock transition occurs to the time a service head transition is detected. For exactly the same reason the clock marks need not be uniform: the Encoder operates on each and every clock mark and produces a picture imprint displaced from the nominal, or preassigned, position by an amount determined by that element's brightness or color, ignoring that other clock marks follow. The Decoder operates in exactly the reverse fashion, it measures time intervals from a clock mark to the service head transition in the assigned space.

It was also determined that extreme accuracy in manufacturing the head carriage is needed in order to have the head's angular position repeatable, since during playback if the head is slightly displaced angularly (for the case of clock omission during recording), this displacement produces unwanted brightness and color variations. If this displacement error is constant, or slowly changing, there are methods such as D-C restoration or others, which can remove the unwanted variations. However, no such method is perfect, and a repeatability in the head travel is definitely desired. A better arrangement is to use a lever instead of a carriage, because the lever has only one pivoting point and, in contrast, a carriage has to be guided by means of a surface; hence, a lever can easily have zero play and thus perfect repeatability. This is anothwer reason why a circular path is more desirable than a straight line. Nevertheless, the reader should be cautioned to the fact that a slight complication arises. The gap of the head must also be circular and, of course, it must match the radius of curvature of the gap's swing. On the other hand, for extremely narrow tracks, as it is well known in elementary analytical geometry, the arc tends to become a straight line and therefore long playing discs requiring narrow tracks have the advantage of easily accepting straight gapped heads that move on swinging levers.

In the course of experimentation with these devices, it was learned that it is not easy to produce narrow track heads as described in U.S. Pat. No. 3,701,846, because the ferrite material is brittle. The present limit for practical gap lengths is about 0.0005 inch. From the above reasoning, we might use slanted straight line paths if the only goal is to achieve the effect of narrow tracks from broad heads. But when the head moves in a straight slant the track widths change, they are broader at the disc's outer periphery and more narrow toward the center. Since the disc's linear velocity is high at the edge and proportionally lower toward the center, a heavily slanted straight-line progress path is undesirable because it pronounces the voltage output variations during playback, i.e. it makes the inner track output voltage even less than normal.

Ideally, the path should be a curve intercepting any disc radius at a constant angle, and this type of curve, or a logarithmic spiral, can be approximated by the usage of a simple swinging lever of the proper length and strategically located pivot as will be shown immediately below.

The general equation of a logarithmic spiral in polar coordinates has the form $r = a \exp(K\theta)$, where $r$ is the radius and $\theta$ the angle in the usual polarity and units, that is increasing in the counterclockwise direction and expressed in radians. Taking now simple differentials on both sides, we have $dr = ka \exp(k\theta)d\theta = krd\theta$ and $rd\theta/dr = 1/k$ or $\tan \psi = 1/k$ where $\psi$ is the angle between the curve's tangent at the point of consideration and the radius $r$.

Now, for convenience, it is desirable to have $\psi = 45°$ since, as it will be considered later, two coexisting recordings have minimum crosstalk when they intercept each other at 90°, the first oriented 45° above the radius and the other 45° below.

Since $\tan 45° = 1$, it follows that $k = 1$ and $r = a \exp \theta$, the particular equation of a logarithmic spiral intercepting all radii of the disc at 45°.

The radius of curvature $\rho$ has the following form:

$$\rho = a\sqrt{(1+k^2)} \exp (k\theta) = a\sqrt{(2)} \exp \theta$$

We also know the useful range of tracks of a 14 inch diameter disc. Assuming a convenient outer edge margin of 0.250 inch, the outermost track becomes 6.750 inch radius. Using now the well known rule that for constant information rate the maximum storage efficiency is reached only when the outer half of the disc's radius is used, the innermost track is at a radius of 3.375 inch, and hence the midtrack radius is 5.062 inch.

For added convenience and symmetry, we can locate the spiral so that it intercepts the midtrack at 45°, or for $r = 5.062$ and $\theta = 45° = (\pi/4)$ rad. Hence, from the particular spiral equation above, we can solve for a: $a = 5.062/\exp(\pi/4) = 2.308$. And our symmetrical and specific spiral becomes $r = 2.308 \exp(\pi/2 - \theta)$. Solving now for the radius of curvature, still at the same point, $\theta = 45°$, $r = 5.062$, we have: $\rho = 2.308 \sqrt{(2)} \exp(\pi/4) = 7.159$. Therefore the spiral can be simulated by a circle of 7.159 inch radius. This simulation is quite accurate and computation shows that at the outermost track the circle intercepts the disc's radius at 42.56° and at the innermost track at 40.01°, instead of the desired 45°. However, this type of error is negligible considering the enormous simplicity and advantages of a swinging lever. This spiral is shown in FIG. 1, 108.

(B) The spiral serves an additional purpose, besides permitting a constant angle projection on each and every track as described above. Because of the symmetry, another logarithmic spiral exists, having the equation $r = 2.308 \exp(\theta - 3\pi/2)$, which intersects the first spiral at 90°, and this is shown in FIG. 1 as 109, the bottom spiral. Spirals 108 and 109 of FIG. 1 are shown more clearly in FIG. 2, the first as line-dot-line, 113, and the other as line-double dot-line, 118. It will be shown that two elemental patterns, each oriented from elemental track to track in the direction of these spirals, coexist independently without interference with each other. A glance at FIG. 2 will show that the ferrite body of transducer 102 records imprints 110 at the position of the lever 107 as shown. As stated previously, in the sense that for maximum recording efficiency only the information transitions are recorded and the clock marks are not, FIG. 2 shows a fairly long sequence of recording: precisely 49 imprints starting from position 110 (in the past) and ending at position 119 (in the present), with one imprint not shown as being under the platform 157 and another coinciding with gap 119. By the time a track is recorded lever 107 has swung slightly toward, say, the inside of the disc to record a new track but the swing is such that there is always at least a slight overlap to ensure merging of the imprints capable of merging. Thus, at the beginning of this swing, imprint 111 is created and at the end of this swing, imprint 112; and, of course, these imprints, even though they are recorded at various times, all lie on a single line 113, also depicted as line-dot-line. Equivalently, transducer 114 swings on its lever 115 and creates imprints at the beginning of recording 116 and at the end of recording 117, which also fall on a single line 118 depicted as line-double dot-line. The meaning of path 113 or 118 is as follows: if the distance between the transducer's gap 102 and the center 105 is unchanged, each of these imprints corresponds to a certain clock mark, let us say a clock mark which for this illustration coincides on the vertical disc axis 120-121. Although the clock transducer is not shown, it is not important to know precisely which clock mark is being read at this instant; all that is necessary is to remember that there is a rigid and unalterable correspondence between all clock marks and axis 120-121. Since the imprints 111 ... 119 ... 112 have all been formed while the disc has the exact same position as shown, it is obvious that they represent the complete time history of a particular picture element, the one corresponding to the clock mark processed by the clock transducer for the same disposition. If the brightness of this picture element is unchanged because it is subject to no motion, then path 113 will be formed. If, on the other hand, there are discontinuities because, for example, the scene changes a few times, or because this element moves, or for any reason its brightness changes, then line 113 will not be perfectly circular; it will contain either tiny wiggles corresponding to continuous variations, or discontinuities or breaks corresponding to sudden variations of brightness. The same considerations apply for transducer 114 and this will also create a path 118 similar to path 113. However, transducer 114 swings on lever 115 which has center 162. Since both levers have the corresponding transducers mounted at their extremities and swing both gaps at a radius of 7.159 inch, it is obvious that if we place center 162 on the center of the gap 119, the path will pass through center 105; therefore, the spiral 118 is the conjugate of spiral 113 and the two spirals will each be read by its corresponding transducer and not by the other, as they intersect at 90°. The intersection of several paths 163, corresponding to path 118 with the disc at different positions, and several paths 164, corresponding to path 113 with the disc at different positions, is shown in the area 165. Obviously, only a few paths are shown for descriptive purposes and their scale is greatly exaggerated for the same reason.

FIG. 7 is a block diagram depicting the means of mechanically moving levers 107 and 115. The two levers may be moved independently or in conjunction with each other depending on the particular application. The actuators may be any one of many commonly used mechanisms such as lead screws or stepping motors.

It is possible to have three recordings on top of each other by recording two of them in the way described above (i.e., by placing with one lever one of the recordings forming a 45 degree angle to the right of the radius, and by placing with a conjunctive lever the other recording at 45 degrees to the left). The third recording will be placed at 0°, or along the disc's radius, by means of a carriage moving the third transducer's gap in a path coinciding with, say, axis 120-121 in FIG. 2. An arrangement employing rectilinearly moving transducers is shown in FIG. 25, described hereinbelow. It is obvious that there is an infinite number of orientations using a logarithmic spiral. This statement is also valid for the rectilinearly moving transducer because the straight line is the degenerative case of the spiral (i.e., $\rho = \infty$). When it comes to color recording, a serious consideration must be given to the fact that none of the three international TV color codes, NTSC, PAL, or SECAM, can be used simply in this invention. The reason is that for the herein described scheme to be successful, all imprints must form continuous paths; however, the above codes are such that identical elements in brightness and color are recorded identically only on the third disc rotation or still later. Therefore, for NTSC recordings, one is faced with two alternatives: first, we can omit every other frame and hence what is left will form continuous paths; or, secondly, we can separate the chrominance and record it uncoded on other portions of the disc. In the second case, we can record the three constituent colors directly and they will form continuous paths, or we can record the luminance (Y') in one place and the color differences (i.e., $R' - Y'$, and $B' - Y'$) in another place.

By avoiding heavy magnetic saturation and more specifically by reducing the head current each time a new elemental pattern is recorded, it is possible to have eight or ten such coexisting patterns, each at a new slant.

Figure 5A:
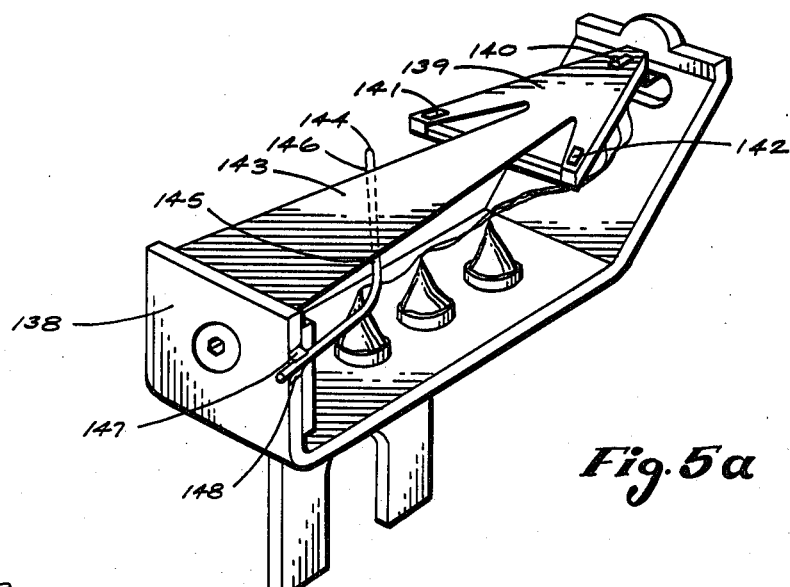
FIG. 5a is a perspective view of one particular embodiment of the present invention, and specifically the Kohn transducer, with a damping wire introduced.
Figure 5B:
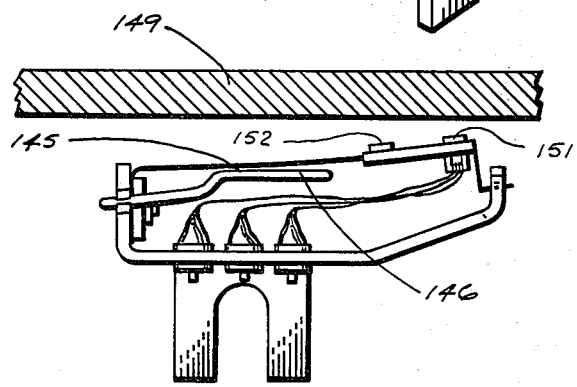
FIG. 5b is an elevation view of the device of FIG. 5a showing a different operational mode thereof. Specifically it shows the attitude of the damping wire when the disc is lifted.
Figure 5C:
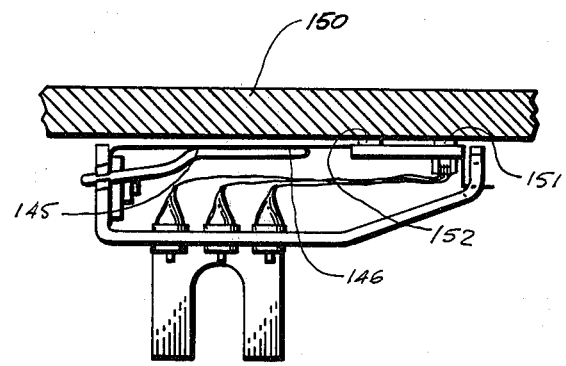
FIG. 5c is a similar view of the Kohn transducer as depicted by FIG. 5b, but with the disc in position.

(C) This invention relates to magnetic disc recorders and particularly to recorders using rotating rigid discs and transducers mounted on flexible supports permitting extremely close proximity, or flying heights from 3 $\mu$in to 30 $\mu$in, between the disc surface and the transducer's recording or reading surface. Generally, the surface of the disc is made very smooth so that its asperities do not interfere with the transducer's flight, and also as planar as possible so that the suspended part of the transducer can follow the axial "runout" of the rotating disc's surface without coming in contact, or "crashing," with it. Typically, a well manufactured disc mounted on a fairly true spindle will exhibit an axial runout of 0.001 in to 0.002 in while rotating at 1800 RPM. A well made transducer, weighing typically about 0.1 g and suspended by a similarly light (about 0.02 g to 0.05 g) resilient member, or system of members, generally in a flat plane, and provided either by this member or by an additional means with a force of about 4 g to 9 g perpendicular to the disc's surface, will be able to accommodate the runout. In fact it will accommodate even a compound runout, that is two full cycles of 0.002 in maximum excursion per revolution. Typical examples of successful transducers are shown in my U.S. Pat. No. 3,701,846, FIG. 21 (suspending members 350 and 351), Pfost's U.S. Pat. No. 3,397,289, FIGS. 4 and 5 (spring 37) and FIG. 8 (suspending members 44 and 45), and Kohn's U.S. Pat. No. 3,349,384, FIG. 1 (suspending member 50). However, this up and down movement of the transducer is invariably accompanied by an unwanted longitudinal movement which changes the position of the recorded magnetization and also the timing of the read-out information, by an unpredictable amount. To give a representative example, if two heads processing two different, but close, tracks receive the same information, and hence record abrupt magnetization reversals simultaneously, the read-out information which is in the form of Gaussian shaped voltage pulses corresponding to the recorded magnetization reversals will show a time variation between the two sets of pulses of about 20 ns to 80 ns, even when the complete transducer assemblies are mounted on the same disc side, and even if the rotating parts are well balanced so that the machine does not show appreciable vibrations. At the usual track radii, say 5.5 in, the above numbers imply that each transducer "jitters" tangential to the track with a total jitter excursion of about 50 $\mu$in. The nature of this movement is fairly complicated and consists of several periods, the most important of which has a value of between 1 ms and 2 ms depending on the transducer construction type. In many instances, especially in television type of recordings as in my U.S. Pat. No. 3,701,846 or in more recent applications of color television recordings, the information read out is compared with a clock information either recorded on the same disc or provided externally in cases of accurately rotating discs and such errors cannot be tolerated. If the dominant jitter period is long enough, say 20 times longer than the duration of the television scanning lines of 63.49 $\eta$s, existing additional information such as the horizontal sync. pulses or the color burst signal may permit timing base correctors to be utilized. But if the jitter period is small, it becomes very difficult to correct its effects. In general, therefore, it has become apparent that jitter-free transducers are very desirable these days.

After lengthy experimentation, it became obvious that the pivoting motion alone of the flat and horizontal resilient member, as described several lines earlier, was not the contributory cause because its typical length (about 0.75 in) and the up and down disc motion (typically 0.002 inch maximum) would have resulted in a jitter amplitude of $\sqrt{(0.75^2 + 0.002^2)} - 0.75 = 2.67$ $\mu$in. However, as stated a little earlier, the total jitter excursions are about 50 $\mu$in or 18 times bigger than the expected jitter resulting from a simple pivoting action. It was further established that the jitter is caused by the resilient member or members vibrating generally in a compound mode, similar to a vibrating bar which is supported by clamping at both ends, one end the transducer's supporting frame and the other the usual platform in turn supported by the disc's boundary air layer. In FIG. 4 the supporting frame is 125, the platform is 157. The resilient member is double, shown more clearly in FIG. 2 as 158 and 159. And in fact, calculations show that the transducer described in Kohn's patent, shown in FIG. 5a, would jitter with a period of approximately 900 Hz for the first mode and 2300 Hz for the second mode, and these numbers are verified by experiment.

Figure 6:
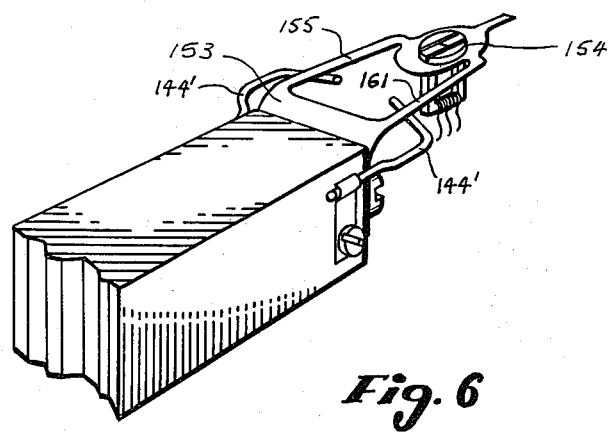
FIG. 6 is a perspective view illustrating an alternative arrangement of that shown in FIG. 5a and specifically the Zenzefilis pill head.

So, the problem is reduced to its simplest form: to damp the transducer resilient supporting members. The most successful means of damping is to employ a length of ordinary wire touching the leaf spring approximately at its middle and preferably at a slanted angle. If the wire touches the middle only, the first mode of vibration is damped. If the wire touches the leaf spring a little to the left and a little to the right, the second and third modes are damped as well. With the wire at a slant all three modes are damped. In the case of transducers in which the head platform is supported by two resilient members two wires are used for damping, one for each resilient member. FIG. 6 shows such a transducer assembly 153 holding a pill shaped head 154 by two resilient members 155 and 161 with damping wires number 144' attached. This transducer is of the same type as shown in FIGS. 20 and 21 of my U.S. Pat. No. 3,701,846. Wires that proved successful are copper, tin-plated, and of a diameter between 0.016 and 0.022 in. As a matter of fact, this arrangement, also shown in FIGS. 5a, 5b, and 5c, reduces the angle of attack of the platform carrying the three bearing members of Kohn's transducer which results in a considerably higher voltage output and also a considerably higher resolution. More specifically, referring to my U.S. Pat. No. 3,881,188, FIG. 15, (A), the damping arrangement just described results in a Gaussian which has higher amplitude by a factor of 1.5 and a smaller distance between inflection points by a factor of 1.2, than would be the case without it.

A rigid support member alternative to the resilient support members of the transducers described above is shown in FIG. 8. In this, support members 166, 167, 168, and 174 are rigid members and bending or pivoting only occurs in members 169, 171, 173, 170, and 172. The rigidity of this supporting arrangement greatly reduces vibrations and the resulting head jitter.

An interesting corollary of the slanted transducer, in the same plane as the disc's surface but in a gap direction other than the orthogonal to the track, described in Section (B) is that the angle of attack, also known as Reynolds Angle, causes the platform to lift upstream by pivoting around the two pads which remain in close proximity to the disc, while the third pad flies higher. This attitude of contact is more stable than the attitude originally intended by Kohn because in the intended operation of his transducer, the platform is tilted so that one of the pads stays in contact while the other two are lifted. To put the matter differently it is now very evident that a platform in a line contact with a surface and in equilibrium with a couple of forces is stable, while the same platform in a point contact also in equilibrium with a couple is not.

Figure 9:
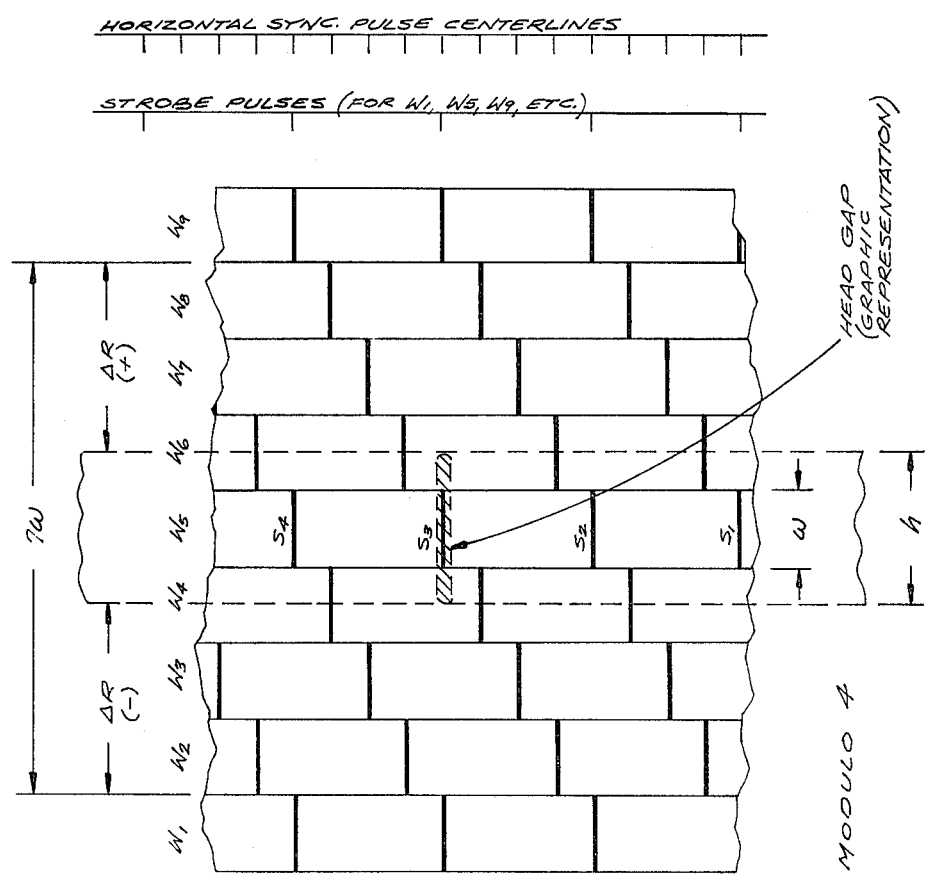
FIG. 9 is a diagram greatly enlarged of a portion of the record medium of FIG. 2, illustrating the positions of sound samples for modulo 4.

(D) In this invention a means is provided to recover sound information when combined video and sound is to be read by a head having a gap length that covers more than one elemental track width, being an improvement of U.S. Pat. No. 3,701,846. When recovering sound information we may have failure either because the head gap covers two sound sample "imprints," a failure type I call *commission*, or because the head fails to cover any imprint, which I call a failure of *omission*. Having sound encoded with every fourth synchronizing pulse (FIGS. 18 and 19 of the aforementioned patent), that is "samples congruent modulo four," the problem of correctly recovering the sound may be considered with reference to FIG. 9 with the following definitions:

$w_r$ = Elemental Track Radial Width
$w_p$ = Elemental Track Path Direction Width
$\Delta R$ = Radial Misalignment
$\Delta P$ = Path Direction Misalignment
$W_1, W_2$, etc. = Consecutive Track
$s_1, s_2$, etc. = Consecutive Sound Samples
H = Horizontal Sync. Interval
h = Head Width It is assumed for clarity that the head is stationary and the medium moves as shown in parallel translation and not in rotation.

In the same figure the gap is shown in its nominal position centered over track $W_5$, which it is meant to read. As a first approach, to avoid errors of commission, $\Delta R \leq \pm (7w - h)/2$. Also in order to avoid errors of omission, $\Delta R \leq \pm (w + h)/2$. These two inequalities are simultaneously satisfied in the shaded area of FIG. 10, which also shows the permissible misalignment in each direction during reading and without electrical correction as will be described next.

As a second and better approach, it has been found that there is a simple electrical method to effectively eliminate the misalignment by shifting the head by one sound sample, which is achieved by simply shifting the strobe pulse train by one horizontal sync. pulse interval, H.

If the head could be positioned with a digital accuracy of one track, meaning that the head may shift only at complete track widths and not in between, then $h \leq 7w$ as shown by the gap position A in FIG. 11. Then we would worry only of errors by commission, that is covering two sound samples. As it was stated above, this situation can be easily cured by shifting the strobe train by one H interval each time errors are detected, and continue the process until no-error operation is achieved. However, we cannot be guaranteed of such digital accuracy, as shown by the gap in position B. Therefore, the maximum value of the gap width versus track width is $h \leq 6w$. Thus, as shown for example at C, the head will always be able to cover at least and at most one sound sample at each strobing pulse, given the liberty to shift the strobe train when commission errors occur.

To avoid errors of omission completely, the minimum head gap length must be, of course, w, as shown at D. There, incidentally, an omission error will occur. Equally, the head can be as large as 3 w as shown at F where again an omission error will occur. For permitting only omission errors, therefore, we have the relation: $w \leq h \leq 3w$. For permitting only commission errors, we have: $3w \leq h \leq 6w$. If it is equally easy to detect either type of error, of omission or of commission, we will have the maximum latitude in head positioning, or $w \leq h \leq 6w$. Since h, the head's gap width is fixed and the elemental track width w is adjustable by the ability to vary the speed of the head advance during the action of recording, the first two of these relations can be put in the following form: pulse-correctable errors of omission only, $h/3 \leq w \leq h$; and pulse-correctable errors of commission only, $h/6 \leq w \leq h/3$. And if both error types can easily be detected, and hence corrected by the stated electrical H interval shift, we will have for both omission and commission errors, $h/6 \leq w \leq h$. This new inequality means that when using a division by 4, we can operate successfully from no overlap to the extent of overlapping six elemental tracks during playback, with the head positioned any place relative to the tracks.

The price we pay for this extreme latitude is a severe reduction of sound bandwidth, $B_s \leq 525 \times 30 \times \frac{1}{2} \times \frac{1}{4} = 1,969$ Hz. The bandwidth can be augmented by a dither or a strumming modulation, as will be seen shortly.

In general, we can say that there is this rule: if it is possible to detect omission or commission errors, the elemental tracks must not be as narrow as to enable the head to read *more* than two sound samples at a time with some margin, or more precisely, $h/\{2(\text{Modulo Number})-2\} \leq w \leq h$. It was found that the correction enabling error-free operation is undetectable to the ear.

Figure 14:
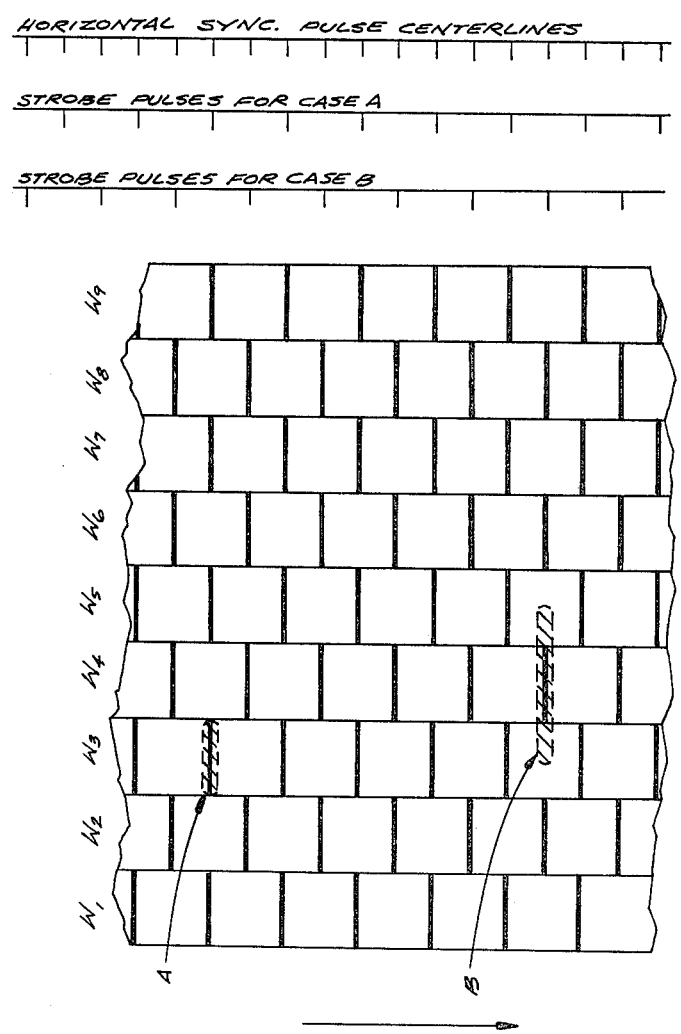
FIG. 14 is a diagram similar to FIG. 12, also for modulo 2 operation, but with electrical correction.

In many cases it is not necessary to reduce so severely the number of sound samples, and division by 2, or sound samples congruent modulo 2, is quite adequate. Performing now the same analysis as for modulo 4 earlier, or more directly by using the rule above, we find that the range of elemental track widths for modulo 2 and with electrical correction whenever errors are detected, is, $h/2 \leq w \leq h$. FIG. 14 serves to illustrate the situation. Incidentally, modulo 2 is useful from another point of view: since errors by omission occur only when $w = h$, no such errors can exist in this case.

To continue the example given earlier with the worm and FIG. 2, and where the head advances by 25 mil per revolution in the direction of the transducer's progress path, and also has a gap width $h = 0.833$ mil, we can construct Table 1 (modulo 2 and 1800 RPM disc) following the note below.

It should be stated, that in the present sound sample analysis, both types of transducer progress paths, radial or slanted, can be equally used without altering any of the stated relations. Therefore, whenever reference is made to the track width w, it can be taken as either $w_r$ or $w_p$, correspondingly.

TABLE 1

| $\Omega$ worm (RPM) | $w_p$ elemental track width (mil) |
|---|---|
| 60 | 0.833 |
| 50 | 0.694 |
| 40 | 0.555 |
| 30 | 0.417 |

Figure 12:
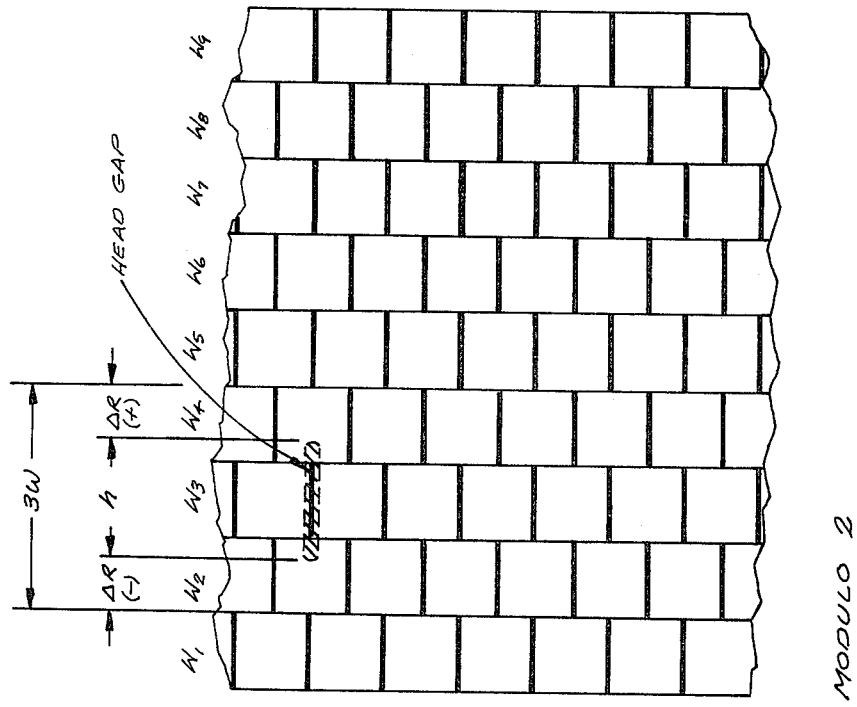
FIG. 12 is a diagram similar to FIG. 9, but for modulo 2 operation.

For this case, i.e., $h = 0.83$ and modulo 2, the permissible screw speed $\Omega$ is in the range, 30 RPM $\leq \Omega \leq$ 60 RPM. Doing now a similar investigation as before for the permissible radial misalignment during reading, if no correction by pulsing is permitted, as shown in FIG. 12: to avoid errors of commission, $\Delta R \leq \pm(3w - h)/2$; to avoid errors of omission (implying that $0 \leq h \leq w$), $\Delta R \leq \pm h$.

Figure 13:
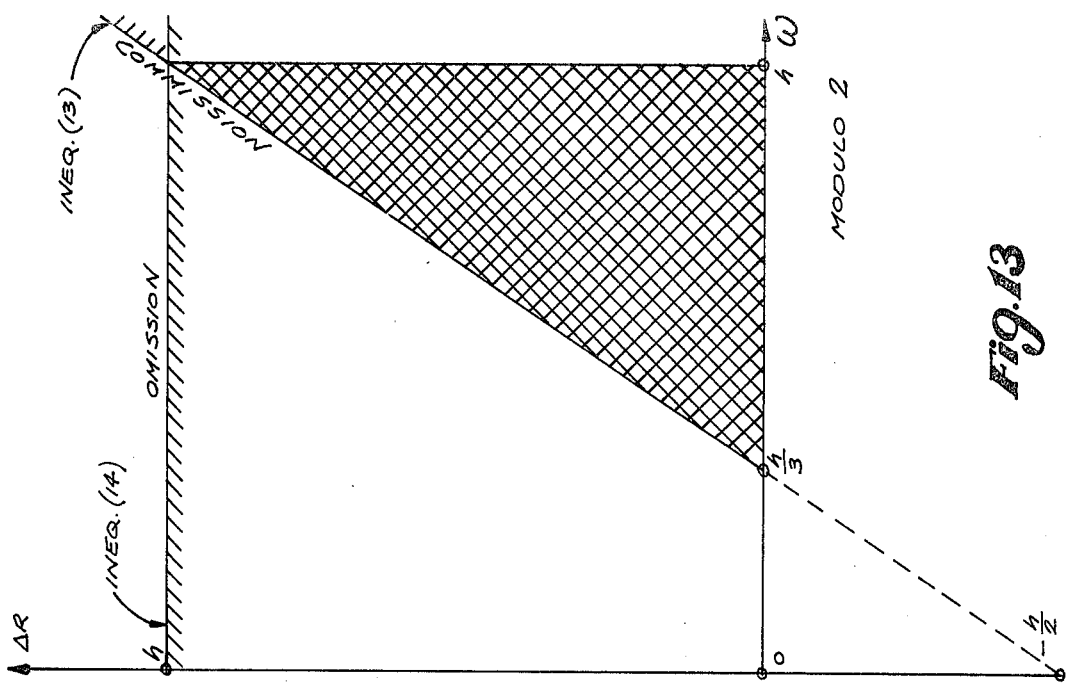
FIG. 13 is a diagram showing the permissible range of head misalignment versus elemental track widths, for modulo 2 sound with no errors and with the head positioned with digital accuracy of one track (no electrical correction)

The above two inequalities are satisfied in the cross-hatched area of FIG. 13.

The sound bandwidth, $\bar{B}_s$, is: $0 \leq B_s \leq 525 \times 30 \times \frac{1}{2} \times \frac{1}{2} = 3,937$ Hz. As stated previously, the sound bandwidth can be reinstated by using additional samples in the same location, which were acquired at other times during the time of video scan. But this method requires compressing analog registers (or digital registers able to record the analog sound value) during recording and expanding registers during reading. Now, there is a simpler method, which has been tried on modulo 2 cases, and which permits reinstatement of the sound bandwidth, $B_s$, up to $525 \times 30 \times \frac{1}{2} = 7,875$ Hz without the above registers. This method, as it will be described in the following text, permits the recording of the additional sound samples in real time and uses once again the precession appearing when dividing 525 sync intervals by 2 or 4.

We can double the sound bandwidth, $B_s$, if the congruency modulus is two, or we can quadruple the sound bandwidth if the modulus is four, by modulating the position of sound samples in every location so that every horizontal sync. will contain at least one sample. For example, in the case of modulo 2, as shown in FIG. 12, we can double the total number of samples by using the locations which have been omitted; to do this the samples shown in the figure are all shifted slightly upstream in relation to the horizontal sync. centerline, and the new samples are placed slightly downstream so that they will not interfere. During recording and also during reading, the processing of sound samples alternates constantly between a position upstream and a position downstream. Hence, I call this modulation "dither." As seen now in FIG. 15, every horizontal sync. interval, 0.08 H, contains two pulses, a and b. The first occurs slightly earlier than the centerline and the other, b, slightly later. FIG. 15 is a schematic presentation of the mechanism. In practice the recorded samples will occupy an angular space which is broad and during playback the samples will be read out in locations that are somewhat more narrow. This process is also known as "strobing" and it is quite common in practice. Also, the choice of a and b alternates both during recording and reading; therefore, only one sound sample is placed and read out on every horizontal sync. Since there are 525 such horizontal pulses, if we start, say, on track $W_1$, with position a, we end with position a also on the 525th horizontal, hence, on track $W_2$, on which the head is found after one disc revolution we automatically start on the first horizontal with position b, as shown in FIG. 15. The head gap is shown on top of position b.

FIG. 16 shows the location of sound samples with dither modulation of a modulo 4 recording.

Figure 18:
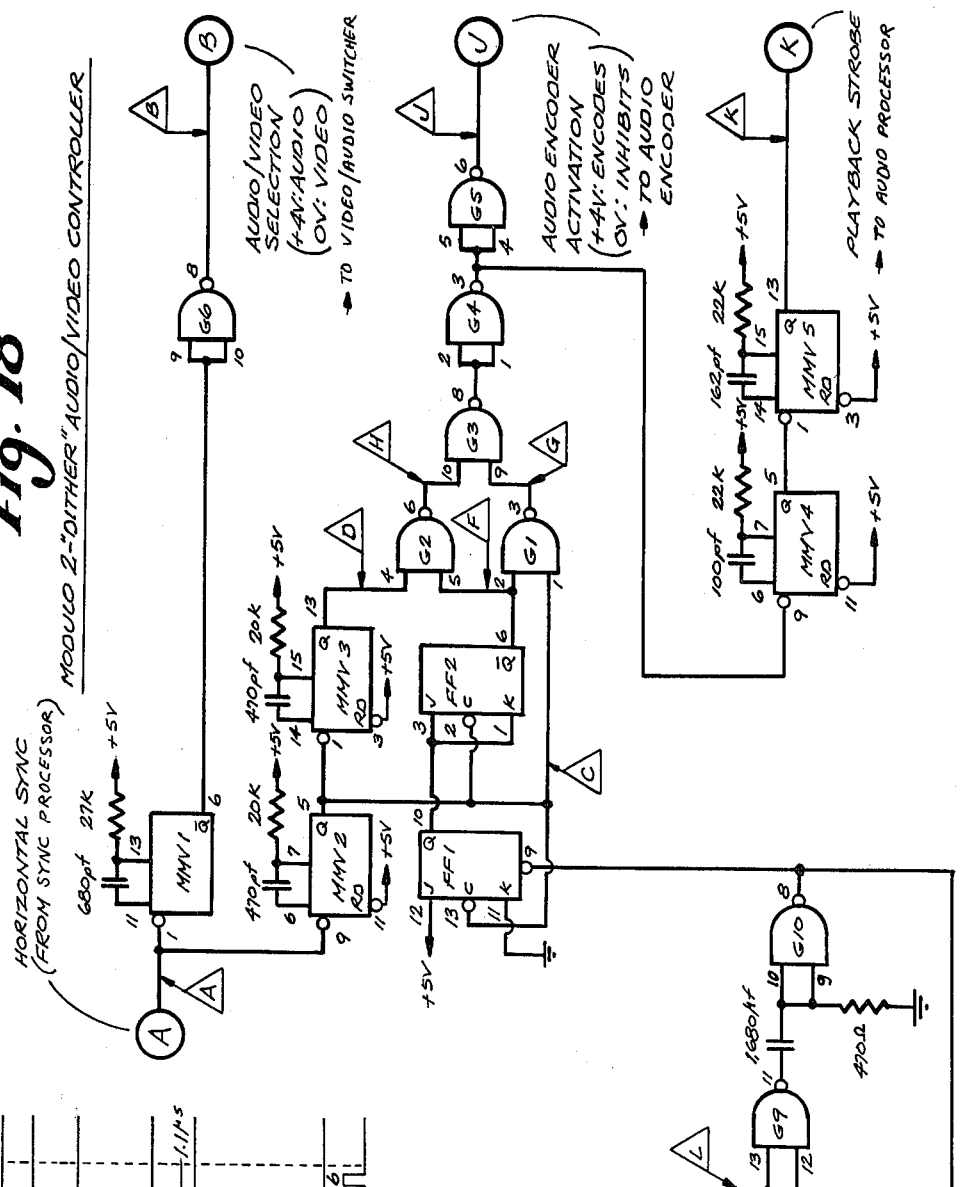
FIG. 18 is a schematic diagram of one embodiment of modulo 2-dither audio/video controller.
Figure 19:
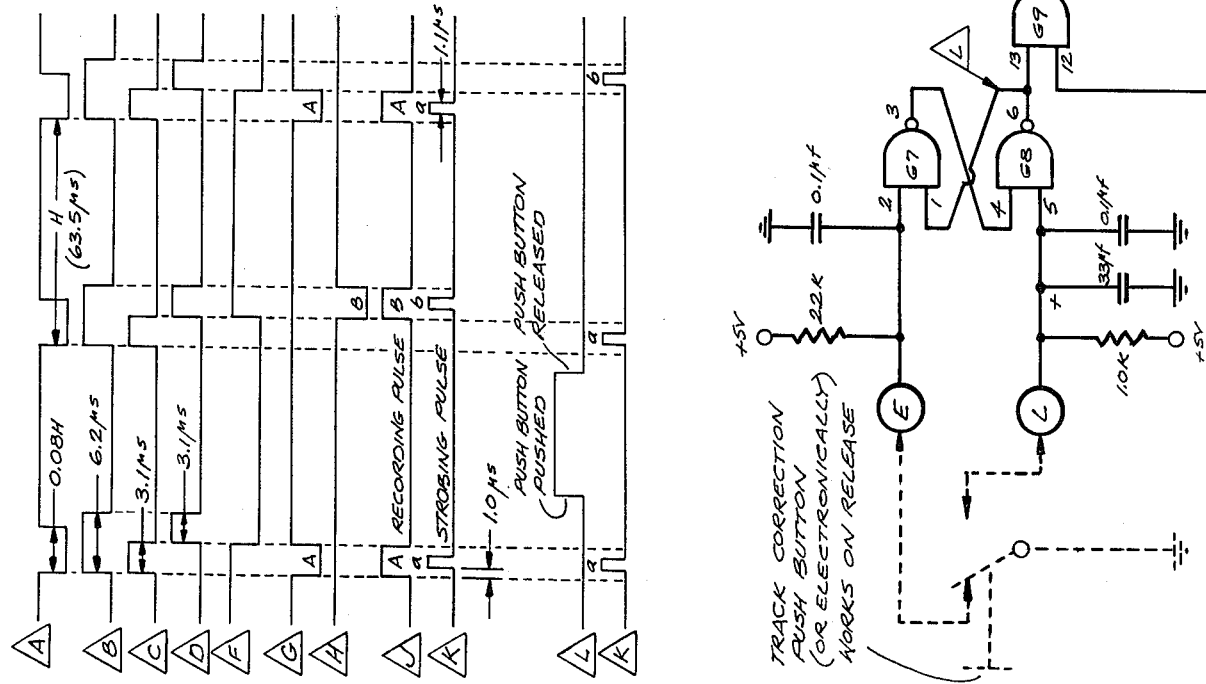
FIG. 19 is a diagram of some important waveforms of the audio/video controller of FIG. 18.

FIG. 19 shows quite clearly the position of the recording locations by means of waveform J and the position of the strobing pulses by waveform K. FIG. 18 shows the actual circuitry that implements the above.

FIG. 17a shows the nominal position of the strobing pulses a and b.

It is obvious that we could provide an even greater number of samples by using more than two strobe pulse positions. For example, with four strobe pulse positions sound samples may be provided at every horizontal sync. using the locations which have been omitted from FIG. 16. This arrangement is shown by the four strumming pulses of FIG. 17b.

FIG. 18 shows the circuitry implementing the sound recording, modulo 2-dither, or the Audio/video controller, and FIG. 19 shows its important waveforms.

Audio/Video Controller

Terminal A is connected to the horizontal sync. pulse train and the circuit produces appropriate pulses at terminals B, J, and K to control the Audio/Video Switcher, the Audio Encoder, and the Playback Audio Processor, respectively. All these are shown as block diagrams in FIG. 24.

The negative going transitions, or leading edges, of the horizontal sync. pulses at A trigger Multivibrator 1 and Multivibrator 2, as can be seen from waveforms A, B, and C of FIG. 19. Multivibrator 1 produces a pulse for each horizontal sync. which is used to control the Audio/Video Switcher input gates predeeding the Write Amplifier, thus permitting the Audio Encoder to be selected during the period of the pulse (or horizontal sync. time) and the Video Encoder outputs the remainder of the time. The output pulse width of waveform B is controlled by the external capacitor and resistor of Multivibrator 1. These are shown fixed with values for black and white recordings where the complete horizontal sync. period, or even more, is used. In the case of color recording it is desired to use less and the resistor and capacitor values need to be correspondingly adjusted.

Multivibrator 2, which is fed by the leading edge of the horizontal sync., produces a positive going pulse of one half the period of Multivibrator 1 (waveform C), the trailing edge of which triggers Multivibrator 3 which produces a pulse which is also one half the period of Multivibrator 1 (waveform D). Thus two trains of pulses are produced, those shown at C and occurring during the first half of the pulses in waveform B, and those shown at D which occur during the second half of the pulses of waveform B. Now to obtain pulses implementing the dither, Flip-Flip 2 and gates G1, G2, and G3 are used.

Flip-Flip 2 is toggled with the trailing edge of each pulse from Multivibrator 2 and its $\overline{Q}$ output, waveform F, is used to enable selection gates G1 and G2, the outputs of which are ORed together by gate 3. From the waveforms it can be seen that pulses from waveform C and waveform D are alternately selected on successive horizontal sync. pulses, providing the dither pulses at terminal J which are used to enable the Audio Encoder during the selected period.

It should be noted that during recording the audio inputs to the Audio/Video Switcher are selected for the full duration of the waveform B pulses but the Audio Encoder is enabled for only one half of each pulse of waveform B. Therefore no transitions are recorded during the portion of waveform B pulses in which waveform J is low, resulting in effective erasing of the disc when no audio is desired to be recorded. This is desirable so that if the head is straddling two tracks during playback, no interfering sound transitions will be picked up by the head from these portions of the disc.

The inverse of waveform J is taken from gate G4 and used to trigger Multivibrator 4, which provides a 1 μs delay, from the leading edge of each pulse of this waveform. The trailing edge of the Multivibrator 4 output triggers Multivibrator 5 which gives a 1.1 μs output, and is used as a Playback Strobe. The result is a train of pulses, shown by waveform K on terminal K, corresponding to the pulses at Terminal J, but more narrow and centered in the pulses appearing there to ensure that during playback only the desired audio sample is strobed.

As mentioned above there is the possibility of errors of commission in the event that during playback the head is not over a track on which the recorded sound samples correspond to the dither strobe pulses. This condition can be detected electrically and a correction made. For simplicity the track correction inputs E and L are shown connected to a pushbutton switch which is depressed each time it is determined that the head is off track. Each depression and release of the pushbutton switch results in a pulse from G8, the negative going edge of which triggers a one-shot made up of G9 and G10 along with an associated capacitor and resistor. Gates G8 and G9 are used as a "de-bouncer" circuit to insure that there is only one pulse out for each depression and release of the push button. These gates are not needed when electrical correction is used and in which case a negative going pulse would be applied to gate G9 each time an error is detected.

The output pulse from G10 (the one-shot output) is applied to the direct reset input of Flip-Flop 1 causing it to be reset to the "0" state. It will be noted that Flip-Flop 1 is clocked by every negative going transition of waveform C and that due to the J input of the Flip-Flop being always enabled and the K input being always inhibited each such clock transition causes the Flip-Flop to go to the set, or "1", condition regardless of its prior condition. In other words, Flip-Flop 1 is always in the set condition except when reset by a pulse from the one-shot made up of G9 and G10 in which case it returns to the set condition on the following clock transition. Since the Q output of Flip-Flop 1 is used to enable the J and K inputs of Flip-Flop 2, Flip-Flop 2 will toggle on every transition unless an error has been detected (causing Flip-Flop 1 to reset) in which case its inputs are inhibited for one clock transition resulting in a reversal of the a and b dither pulse positions from that point on, giving the desired correction.

The circuit shown in FIG. 18 is for descriptive purposes and similar circuits for other modulo can easily be designed.

Video Decoder

One embodiment of the video decoder is shown in FIG. 20 with its important corresponding waveforms shown in FIG. 21. The waveforms correspond to the signals seen at the point of the circuit marked by the same letter in a triangle. In the playback mode the video decoder converts the encoded video signal read from the disc into an analog video waveform, which after having the composite sync. reinstated becomes suitable for presentation directly to a standard television monitor. The video decoder receives two encoded video signals from the read amplifier which are conjugates of each other on terminals R and S. Two corresponding conjugate clock waveforms FF* CLOCK and FF CLOCK are received from the clock processor on terminals P and Q respectively. Back Porch Pulse* and Back Porch Pulse are received on terminals M and N for use in a special D-C restoration of the output signal which the circuit produces on terminal W. This restoration is special in the sense that the back porch voltage of the initial TV signal is recorded with arbitrary level which may and may not be constant, as it will be seen when the Encoder is explained. Its main purpose is to remove the greater part of head jitter induced variations.

The encoded video signal at terminal R is applied to the base of transistor Q3 through resistor R8 and capacitor C1 is turned on during the positive portions of the waveform. When Q3 is turned on, transistor Q4 which is connected as an emitter follower constant current generator is also turned on, providing a constant current, determined by the value of resistor R10, for charging the ramp capacitor C2. Thus the constant current generator is turned on during the positive portions of the encoded video in signal, waveform R causing a ramp of constant slope to be generated. During the time the encoded video input waveform R, is low the ramp generator is held off and the charge on the capacitor remains essentially constant. The FF* clock input, waveform P, is applied to the base of transistor Q5 through a differentiator made up of resistor R6 and inductor L1 causing the transistor to turn on momentarily with the occurrence of each positive transition of the FF* clock input. The momentary turning on of transistor Q5 causes capacitor C2 to be discharged to ground potential and then to be released to be charged at a constant rate until the next transition, the negative going transition, of the encoded video input. At that time the voltage is held constant until the next positive going transition of the encoded video input. This voltage is an analog value which is proportional to the time between the clock transition which caused the ramp capacitor C2 to discharge and the following transition of the encoded video signal input, which is also proportional to the distance between these imprints on the disc. This operation can be seen from waveforms R, P, and T.

The same operation is performed by the lower branch of FIG. 20 made up of transistors Q8, Q9, and Q10 and the corresponding associated components as above, but with the encoded video* in FF clock in signals which are the conjugates of the corresponding signals to the upper branch whose operation has been described above. Thus it can be seen that the upper branch converts the picture elements which correspond to the position of a negative transition of the encoded video in signal, waveform R, into an analog signal and the lower branch converts the alternate elements, or those which correspond to the position of a positive going transition of the same signal.

To obtain the desired output, the pertinent portions of the two branches must be mixed together. This is accomplished by transistors Q7 and Q12, which are connected as emitter followers with a common emitter resistor. To permit only the desired portions of the signal from each branch to pass through the associated emitter follower, transistors Q6 and Q11 are turned on during the time that the constant current generator of their respective branches are on, causing the junction point of the resistors coupling the signal to the associated emitter follower to be pulled to ground level. In the case of the top branch, when transistor Q6 is turned on, the junction of resistors R11 and R12 is grounded causing the emitter follower, transistor Q7 to be turned off allowing the emitter follower, transistor Q12, associated with the lower branch to pass the value held by its ramp capacitor C4 to be coupled through to transistor Q13. Transistor Q13 provides an inversion and also drives the low pass filter comprised of inductors L3, L4, and L5, and capacitors C7, C8, and C9. Resistor R27 provides the proper impedance for the filter. The decoded and filtered signal is fed by transistor Q14, connected as an emitter follower, through capacitor C10 to the base of the output transistor Q15 where it is clamped or D-C restored by means of the clamping circuit made up of transistors Q1 and Q2 along with the associated resistors and diodes. The purposes of this clamping is to remove gross effects of head jitter between the clock head and service head. Waveforms W' and W of FIG. 21 show the ideal waveform with no jitter and the waveform showing the results of jitter with the clamping employed. It will be seen that each horizontal line starts correctly due to the back porch clamping but that the error gradually increases toward the end of the scan line. This error is reduced or eliminated by employing other aspects of the present invention which reduce or eliminate the jitter of the heads.

Video Encoder

FIG. 22 shows one embodiment of the video encoder required to encode the video signal for recording the elemental patter of both the present invention and my patent 3,701,846. This circuit is an improvement of the circuit shown in the above mentioned patent FIG. 15, and is also shown in greater detail. The video encoder analyzes the video signal into picture elements, as determined by the clock signal, and encodes each element in pulse length code with the clock marks removed. If the clock elements are uniformly spaced then the code is identical to phase modulation. In addition, this circuit performs three important tasks, mentioned already in the preceding text: it clips the sync. pulses almost completely since they can be reinstated afterward by the Video Processor for maximum utilization of the properties of the recording medium, it clamps the back porch at an arbitrary level, which may or may not be constant, removing unwanted variations of picture brightness due to disc speed variations or remanent head jitter, and it also ensures that corresponding picture elements are recorded with the same binary polarity.

Terminal A is connected to the video signal from the TV camera, terminal G is connected to the FF clock train from the clock processor, terminal B is connected to the clock* pulse train from the clock processor and terminal J is connected to ground during the recording operation. The circuit produces encoded conjugate outputs at terminals F and K which are fed to the audio/video switcher. FIG. 23 shows the important waveforms of the circuit.

The video input signal is inverted, amplified, and has its sync. clipped by transistor stage Q1. Potentiometer R3 adjusts the gain and potentiometer R4 adjusts the degree of clipping of the sync. The base of Q3 receives a back porch positive pulse from the sync. processor and clamps the video signal at the base of Q4 during a portion of the back porch of the signal providing a reference level set by R7, which will be reinstated afterward by the Video Decoder. Q4 is an emitter follower whose output is applied to one input of a voltage comparator OA1 in which the video signal is compared to a locally generated ramp of constant slope signal. This comparison is shown in FIG. 23 by waveforms C and D. It will be noted from waveform E that the output of the comparator OA1 is digital in nature; it has a fixed positive voltage whenever the ramp amplitude is less than the video signal amplitude and it has a ground potential whenever the ramp amplitude is greater than the video signal amplitude.

To ensure proper merging of corresponding elemental imprints in successive frames or elemental tracks, it is necessary to make sure the polarities of magnetization are the same for any given element from frame to frame. This is accomplished by connecting the FF clock signal from the clock processor on terminal G to the J input of Flip-Flop FF1 thereby allowing it to be triggered to the set condition only when the FF clock signal at the J input is high just prior to and during the clock transition to the Flip-Flop FF1. Since the FF clock signal has a fixed relationship to the elements of the picture, the polarity for any given picture element will always be the same. In the event noise would cause the Flip-Flop FF1 to be clocked to the wrong state, it would be back in proper phase within two clock periods.

System Block Diagram

A general and simplified configuration of a system which embodies the present invention is shown in FIGS. 7 and 24. FIG. 7 depicts the means of mechanically moving and controlling the movement of the levers 107 and 115 on which the transducers 102 and 114 are mounted (as shown in FIG. 2) by means of actuators 197 controlled by the control element 196. The two levers may be moved independently or in conjunction with each other depending on the application. For example if the coexisting elemental recordings are being used to extend playing time and only one transducer is used at a time then the levers may be moved independently, however, in the case of recording related signals such as color difference signals, or R, G, B signals the levers must be moved together in a fixed relationship. The actuators may be any one of many commonly used mechanisms such as lead screws, stepping motors, or cables. The control is a simple on off and direction control when variable density recording is not used, and may be either operator controlled or electrically controlled for variable density recording, fast motion playback, or slow motion playback. The control path shown from the control element 196 to the disc motor 129 may be simply power on, or in the case of a servo motor conventional servo control voltages.

The signal processing system, depicted by the block diagram in FIG. 24 includes a storage disc 100 rotated by a motor 129, a clock head or transducer 195 which reads prerecorded clock transitions, and a service head or transducer 102 which magnetizes discrete areas of the disc along a track of the disc alternating plus and minus polarity and of selected lengths as described in my U.S. Pat. No. 3,701,846 FIGS. 5 through 7 during the recording operation and detects or reads the recorded transitions during the playback operation, and the related electrical circuitry.

The read amplifiers 178 and 179 are conventional amplifiers of the type described in my U.S. Pat. No. 3,974,329 FIG. 14 and are used to amplify the signals from the clock head 195 and service head 102 respectively. The clock/sync. separator 180 decodes the output from the clock read amplifier 178 and separates it into sync. signals which are fed to the sync. processor 181 and clock transitions which are fed to the clock processor 182. The sync. processor 181 separates the horizontal and vertical sync. providing the required sync. signals for the TV camera 192, the audio/video controller 183, and also generates "back porch" pulses which occur in the back porch area of the video signal immediately following every horizontal sync. and which are used in the video encoder 190 and video decoder 184 for clamping or D-C restoration purposes. The clock processor 182 generates the clock pulse signal clock*, the FF clock and FF* clock signals (an asterisk * denotes a ground level true signal) required by the video encoder 190 and video decoder 184. All circuitry in the sync. processor and clock processor is conventional circuitry.

The modulo 2 version of the audio/video controller 183 which has already been described and is shown in FIG. 18 provides control signals to the audio/video switcher 188, the audio encoder 189, and the audio processor 186.

To perform the record operation switch 198 is placed in the Record position causing the service head 102 to be connected to the write amplifier 177 which is similar to that described in my patent 3,974,329 FIG. 12, and causing the write amplifier to be turned on. In the record mode the audio encoder 189 and the video encoder 190 receive input signals from the microphone 191 and TV camera 192 respectively and encode these signals for recording. The audio encoder 189 is only enabled during the portion of each horizontal sync. that a sound sample should be recorded. This is controlled by waveform J of the audio/video controller 183 shown in FIG. 19. During all other times the audio encoder outputs are unchanging. The audio/video switcher 188 selects the outputs of the audio encoder 189 during the horizontal sync. period and the output of the video encoder 190 at all other times, feeding them to the right amplifier to be recorded.

Figure 10:
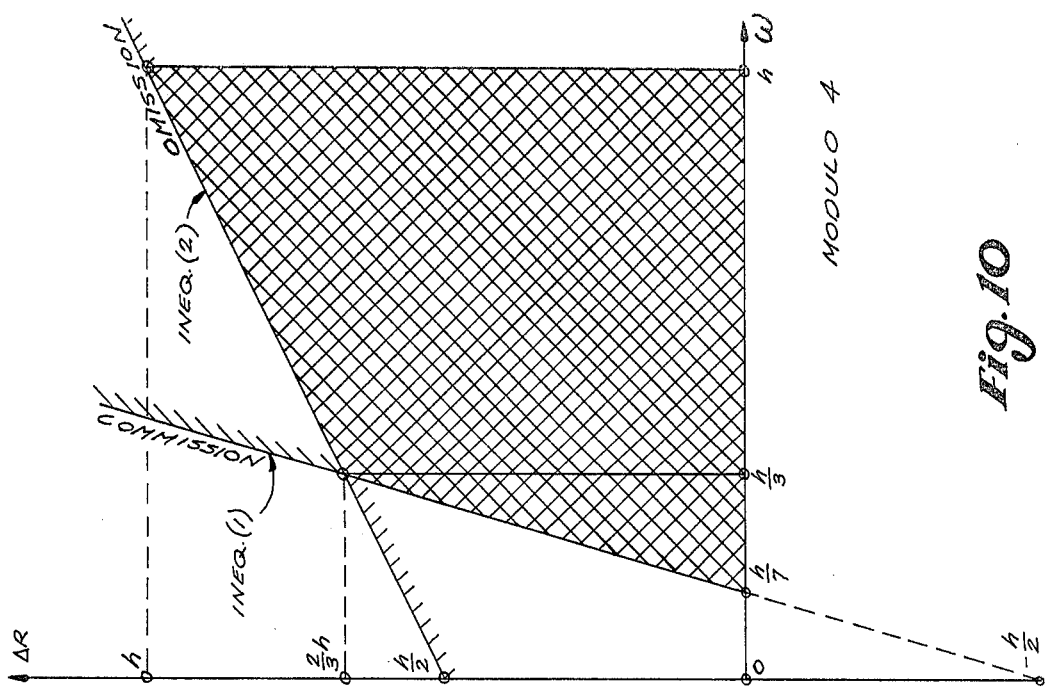
FIG. 10 is a diagram showing the permissible range of head misalignment versus elemental track widths, for modulo 4 sound with no errors and with the head positioned with digital accuracy of one track (no electrical correction)

To perform the read operation, switch 198 is placed in the read position causing the service head 102 to be connected to the read amplifier 179 and also causing the write amplifier 77 to be turned off. The output of the read amplifier 179 is fed to both the video decoder 184 and the audio decoder 185. The video decoder 184, one embodiment of which is shown in FIG. 20, decodes the output of the read amplifier 179 as described above, providing decoded video output to the video processor 187 which reinstates the sync. pulses providing a composite video output to the TV monitor 194. The video processor 187 utilizes conventional circuitry. The audio decoder 185, which is similar to the decoder shown in my U.S. Pat. No. 3,974,329 FIG. 10, provides a decoded output which is sampled by the audio processor 186 during the appropriate portions of the horizontal sync. interval as controlled by the audio/video controller 183. These samples are processed by a sample and hold circuit, the output of which is filtered and amplified and fed to the speaker 193. The sample and hold filtering and amplifying circuits in the audio processor 186 are conventional circuitry.

FIG. 25 shows an alternative arrangement in accordance with the invention. The arrangement depicted in FIG. 25 is like the arrangement of FIG. 2 except that the transducers and their drive arrangements are intercoupled so that the transducers are driven along straight-line paths not coinciding with any radius of the disc. Reference may be made to FIG. 2 for details of the disc operating system, since only the transducer drive arrangement is shown in any detail in FIG. 25. In FIG. 25, the transducer assemblies 156', 157' correspond to the arrangement shown in FIG. 4 and are supported on transducer arms 115', 107', respectively. These support arms are like the levers 107, 115 of FIG. 2, except that they are mounted for linear, rather than pivotal, movement. The support arms 107', 115' are slidably positioned on respective guide rods 210, 212 which extend between respective frame members 211, 213 and the central frame member 128. If desired, the guide members 210 and 212 could be portions of a single, continuous rod.

As is shown in the partially sectioned view of support arm 107', a threaded drive rod 214 engages a corresponding threaded portion 216 to enable the support arm 107' and its associated transducer to be moved along the guide rod 210 as the hand wheel 220 is cranked to drive the rod 214. A corresponding arrangement comprising the threaded drive rod 218 and handwheel 222 is provided to drive the support arm 115' along the guide rod 212. Movement of the transducer assemblies 156', 157' in this manner, while recording, results in the development of imprints on the disc 100 along the lines 224, 226, respectively. By reference to FIG. 2, it will be seen that the result is a pattern of recorded imprints superimposed at angles to each other. That is, imprints recorded by the right-hand transducer assembly 157' will be at an angle to imprints recorded by the left-hand transducer assembly 156'. This angle will vary, depending upon the relative positions of the transducers at the time the imprints are recorded, but will generally approximate 90° within the useful area of recording on the disc. Playback of the recorded imprints is accomplished similarly to the manner already described, wherein the transducers are operated in the playback mode while being propelled along the lines 224, 226.

FIG. 26 illustrates an arrangement exactly like that of FIG. 2 except that a third transducer assembly 230 has been added for movement radially of the disc 100. The assembly 230 incorporates a transducer and support arm 232 much like the arrangement of the transducer 126 and arm 157 of FIG. 4, except that the arrangement 232 is suspended from additional support element 234. Like the linear drive arrangements shown in FIG. 25, the transducer assembly 230 is mounted for linear movement by means of a guide rod 236, a threaded drive rod 238 and handwheel 240 supported on a frame member 242. The mounting of the assembly 230 positions the transducer of sub-assembly 232 with its gap aligned with, and directed for movement along, a radius line 121, as indicated in FIG. 2 and discussed above. Imprints recorded by the transducer of sub-assembly 232 will be at angles intersecting the imprints recorded by transducers 102 and 114 of the pivoted arms shown in the Figure. The angles of intersection of the imprints from the radially aligned transducer, relative to the imprints recorded by the transducers 102, 114 of the pivoted arms, will approximate 45° for the useful area of recording on the disc 100.

I claim:

1. Apparatus for recording or reproducing video signals onto or from a recording disc, said apparatus comprising:
    a recording disc;
    means for rotating said recording disc at a constant rate about a center of rotation;
    a first transducer for recording or reproducing video signals onto or from a selected portion of said recording disc, said first transducer being of the magnetic type and having a substantially straight recording gap for recording or reading imprints representing said video signals in a succession of tracks about the center of rotation, the imprints of the video signals for a given picture element being merged from track to track to form a continuous line intersecting different radii of the disc at substantially equal angles;
    said first transducer being mounted on a pivoted lever, the gap of said first transducer being disposed substantially at right angles to said lever and tangent to the line to which it is adjacent, the pivot point of said lever being displaced from said center of rotation and being selected so that motion of said lever about its pivot point will cause said gap to move along the lines of imprints; and
    means for swinging said lever while said disc is being rotated.

2. Apparatus as defined in claim 1 wherein said means for rotating said lever consists of a hand-operable device whereby the motion of said lever can be increased or decreased at will depending on a scene to be recorded or reproduced.

3. Apparatus as defined in claim 2 wherein said lever is movable to produce an overlap of adjacent tracks recorded by said gap of between substantially 20% and 80%, the overlap depending on whether slow moving scenes or fast moving scenes are being recorded or reproduced.

4. Apparatus as defined in claim 1 wherein said lever is automatically moved by an actuator at a speed selectively controllable.

5. Apparatus as defined in claim 1 further including a second transducer of the magnetic type and a second lever for supporting said second transducer, said second lever having a pivot point different from that of said first lever and displaced from said center of rotation, and arranged so that said second transducer follows substantially a series of second imprint lines intersecting the first-mentioned imprint lines, said second transducer having a gap disposed substantially normal to said second lever, whereby said first and second transducers may be used simultaneously for recording or reproducing video signals onto or from said record disc, the progress paths along which the gaps of said transducers are moved being conjugate to each other, and whereby the intersecting imprints cross at an angle of substantially 90 degrees with each other on said record disc.

6. Apparatus as defined in claim 1 wherein said first transducer records on a time-sharing basis both video and audio signals, wherein said audio signals are recorded during every second sync interval, and wherein the width of the gap of said transducer is less than six times the width of the track recorded.

7. Apparatus as defined in claim 1 wherein said transducer records both video and audio signals on a time-sharing basis and wherein the audio signals are recorded during every fourth sync interval, the width of the gap of said transducer being less than three times the width of the recorded track, whereby said gap covers one, and no more than one, sound imprint.

8. The apparatus of claim 1 or claim 5 further including another transducer of the magnetic type and means for mounting the transducer and moving it along a straight line path aligned with a radius of the disc for developing a pattern of straight line imprints merged from track to track and oriented at a substantial angle to imprint patterns from other transducers.

9. The apparatus of claim 8 wherein said another transducer is oriented with its gap in alignment with the progress path of its transducer.

10. The apparatus of claim 8 wherein the progress path of said another transducer is a straight line.

11. The apparatus of claim 8 wherein the imprint pattern corresponding to said another transducer constitutes a plurality of substantially straight lines.

12. The method of recording video signals on a selected portion of a recording medium by means of a transducer having a recording gap, said method comprising the steps of:

provviding relative rotation between the transducer and the recording medium about a center of rotation;

causing the transducer to describe a predetermined curve upon the recording medium during relative motion thereof to define a first transducer progress path approximating a logarithmic spiral within the selected portion, the curve intersecting different radii within the selected portion at substantially equal angles and having a center of curvature at a point different from the center of rotation; and orienting the gap of the transducer at a selected angle with respect to the curve of the transducer progress path.

13. The method defined in claim 12 wherein the gap of the transducer is oriented tangentially to the transducer progress path.

14. The method defined in claim 12 and utilizing a second transducer, said method including the steps of causing the second transducer to follow a second curved transducer progress path which approximates a logarithmic spiral within the selected portion and which has a center of curvature located at a point different from the center of curvature of the first transducer progress path and from the center of rotation.

15. The method defined in claim 12 wherein the transducer progress paths for the two transducers form conjugate approximate logarithmic spirals intersecting each other at substantially 90 degrees.

16. Apparatus for reading or recording an image represented by video signals on a portion of a recording surface, the video image being made up of frames, each frame being formed of scan lines separated by sync intervals, said apparatus comprising:

a transducer mounted adjacent the recording surface;

means for introducing relative rotation between the transducer and the recording surface about a center of rotation;

means for introducing additional relative movement between the transducer and the recording surface such that the transducer relative to the recording surface traverses a continuous transducer progress path approximating a logarithmic spiral within said portion with the transducer aligned to intersect different radii of the center of rotation at substantially equal angles;

a display device; and means for coupling said transducer to said display device to present on said display device the video image recorded on the recording surface.

17. Apparatus as defined in claim 16 wherein said transducer reads or records both video and audio signals on the recording surface on a time sharing basis, said audio signals being recorded at predetermined periods corresponding to selected sync intervals; a speaker; and means coupled between said transducer and said speaker for segregating the audio signals on said speaker and the video signals on said display device.

18. Apparatus for recording or reproducing video signals onto or from a recording disc, said apparatus comprising:

a recording disc;

means for rotating said recording disc about a center of rotation;

a transducer for recording or reproducing video signals onto or from said recording disc, said transducer being of the magnetic type and having a recording gap;

said transducer being mounted on a pivoted lever, the gap of said transducer being disposed substantially at right angles to said lever, the pivot point of said lever being displaced from said center of rotation and being selected so that motion of said lever about its pivot point will cause said gap to move along a curve approximating a logarithmic spiral in the record portion of the disc, the curve intersecting different radii in the record portion at substantially equal angles;

means for swinging said lever while said disc is being rotated;

a television camera;

a television picture reproducing device; and means for selectively coupling said transducer either to said camera or to said reproducing device for either recording on said disc or reproducing from said disc a time changing picture.

19. Apparatus for reproducing and displaying previously recorded video signals from a recording disc, said apparatus comprising;

a recording disc;

means for rotating said recording disc about a center of rotation;

a transducer for reproducing video signals from said recording disc, said transducer being of the magnetic type and having a recording gap;

said transducer being mounted on a pivoted lever, the gap of said transducer being disposed substantially at right angles to said lever, the pivot point of said lever being displaced from said center of rotation and being selected so that motion of said lever about its pivot point will cause said gap to follow a progress path approximating a logarithmic spiral within a selected record portion of the disc, said progress path intersecting different radii of the recording disc center of rotation at substantially equal angles;

means for swinging said lever while said disc is being rotated;

a video signal display device; and means for coupling said transducer to said display device to display the video signals recorded on said recording disc.

20. Apparatus as defined in claim 19 wherein audio signals are additionally recorded on said recording disc, said audio signals being recorded on a time sharing basis with said video signals, said apparatus further comprising a speaker for reproducing audio signals, means for coupling said transducer to said speaker and including an audio/video controller for segregating the video and audio signals and impressing them respectively on said display device and said speaker.

21. A method of recording a time changing picture on a rotating surface having a center of rotation wherein the picture is formed of frames and each frame is formed of scan lines, the method comprising the steps of:

breaking each scan line into a number of picture elements at intervals along such scan line, each picture element having a fixed display position from frame to frame; and recording in coaxial paths on the recording surface an imprint for each picture element such that the imprints from coaxial path to path for the picture elements having the same display position from frame to frame are located along a continuous transducer progress path with adjacent imprints for a given display position being merged together and intersecting different radii of the center of rotation at substantial angles thereto throughout the extent of the progress path.

22. The method of claim 21, in which the imprints are aligned with the transducer progress path.

23. The method of claim 21, in which the recording step comprises recording the imprints nonperpendicularly to the coaxial paths.

24. The method of claim 23, additionally comprising the step of varying the degree of overlap of the imprints from parallel path to path in accordance with the degree of time change in the picture from frame to frame.

25. The method of claim 21, additionally comprising the steps of recording one or more reference imprints on the recording surface and generating a plurality of clock pulses from the one or more reference imprints synchronized to the relative rotation, each picture element from frame to frame having a corresponding clock pulse from revolution to revolution of the relative rotation; and the recording step comprises recording one discrete imprint for each picture element at a predetermined time relative to the corresponding clock pulse, the time relationship between imprint and corresponding clock pulse representing video information.

26. The method of claim 25, in which the step of recording one or more reference imprints on the recording surface comprises recording one reference imprint on the recording surface for each of the plurality of clock pulses.

27. The method of claim 21, in which the imprints from coaxial path to path of the picture elements having the same display position from frame to frame follow a curved transducer progress path.

28. The method of claim 27, in which the curved transducer progress path intersects all the different radii of the axis of rotation at substantially the same angle.

29. The method of claim 28, in which the imprints are each oriented tangentially to the transducer progress path.

30. The method of claim 21 in which the recording is by means of a magnetic transducer having a gap aligned with the transducer progress path, and further including the step of moving the transducer along a straight line progress path so that the imprints from coaxial path to path of the picture elements having the same display position from frame to frame follow straight lines.

31. The method of claim 30 further comprising repeating each of the steps of claim 21 for recording a different time changing picture by means of another magnetic transducer having a gap aligned with its progress path, moving the other transducer in a straight line progress path different from the first-mentioned progress path such that the imprint from the other transducer at any given point on the surface forms a substantial angle with the imprint from the first-mentioned transducer at that point.

32. A method of recording first and second time changing pictures on a rotating magnetic surface having a center of rotation wherein each picture is formed of frames and each frame is formed of scan lines, the method comprising the steps of:
breaking each scan line of the first picture into a number of picture elements at intervals along such scan line, each picture element having a fixed display position from frame to frame;
recording in coaxial paths on the recording surface one discrete, magnetizing imprint for each picture element of the first picture such that the imprints from coaxial path to path for the picture elements of the first picture having the same display position from frame to frame are located along a continuous transducer progress path with adjacent imprints for a given display position being merged together and intersecting different radii of the center of rotation at a substantially constant angle;
breaking each scan line of the second picture into a number of picture elements at intervals along such scan line, each picture element having a fixed display position from frame to frame; and
recording in coaxial paths on the same area of the recording surface as the first picture one discrete magnetizing imprint for each picture element of the second picture such that the imprints from coaxial path to path for the picture elements of the second picture having the same display position from frame to frame are located along a continuous transducer progress path with adjacent imprints for a given display position being merged together and intersecting different radii of the center of rotation at a second substantially constant angle which differs from the first-mentioned angle such that the imprints for the picture elements of the second picture are oriented differently from the imprints for the picture elements of the first picture.

33. The method of claim 32, in which the imprints for the picture elements of the second picture are oriented orthogonally to the imprints for the picture elements of the first picture.

34. The method of claim 32, in which the step of recording imprints for each picture element of the first picture comprises recording imprints oriented at an angle of approximately 45° to the coaxial paths, and the step of recording imprints for each picture element of the second picture comprises recording imprints oriented at an angle of approximately 45° to the coaxial paths and at an angle of approximately 90° to the imprints for the picture elements of the first picture.

35. The method of claim 32, in which the imprints of the picture elements of at least one of the pictures are oriented tangentially to the transducer progress path for such picture elements.

36. The method of claim 32, in which the transducer progress paths for the first and second pictures are conjugates of one another.

37. The method of claim 32 including recording a third time changing picture on said rotating magnetic surface by breaking each scan line of the third picture into a number of picture elements at intervals along such scan line, each picture element having a fixed display position from frame to frame, and recording in coaxial paths on said same area one discrete magnetizing imprint for each picture element of the third picture such that the imprints from coaxial path to path for the picture elements of the third picture having the same display position from frame to frame are along a continuous transducer progress path extending generally along a radius through the center of rotation with adjacent imprints for a given display position being merged together.

38. Apparatus for reading or recording a changing, i.e., video picture, on a recording surface wherein the picture is formed of frames and each frame is formed of scan lines containing a number of picture elements and wherein the record of the video picture is a plurality of continuous lines, each comprising a plurality of merged imprints representing a corresponding picture element, the apparatus comprising:

a transducer mounted adjacent the recording surface;

means for introducing relative rotation between the transducer and the recording surface about a center of rotation traversing a succession of tracks corresponding to successive frames of the picture; and means for introducing relative movement between the transducer and the recording surface such that the transducer relative to the recording surface traverses a continuous transducer progress path aligned with the continuous lines and intersecting different radii of the center of rotation at substantially equal angles.

39. The apparatus of claim 38, in which the transducer is a magnetic transducer having a head gap oriented tangentially to the transducer progress path.

40. The apparatus of claim 38, in which the means for introducing relative movement between the transducer and the recording surface comprises means for pivotably supporting the transducer to rotate about an axis perpendicular to the recording surface.

41. Apparatus for recording or reproducing video signals onto or from a recording disc, said apparatus comprising:

a recording disc;

means for rotating said recording disc at a constant rate about a center of rotation;

a first transducer for recording or reproducing first video signals onto or from a selected portion of said recording disc, said first transducer being of the magnetic type and having a substantially straight recording gap for recording or reading imprints representing said first video signals in a succession of tracks about the center of rotation, the imprints of the first video signals for a given picture element being merged from track to track to form a continuous line intersecting different radii of the disc;

means for moving said first transducer relative to the center of rotation along a progress path which is always slanted relative to the intersected radii of the disc;

a second transducer for recording or reproducing second video signals onto or from said selected portion, said second transducer being of the magnetic type and having a substantially straight recording gap for recording or reading imprints representing said second video signals in a succession of tracks about the center of rotation, the imprints of the second video signals for a given second picture element being merged from track to track to form a second continuous line at a substantial angle to a corresponding line of the first transducer; and means for moving said second transducer along a second progress path to develop said second lines.

42. The apparatus of claim 41 wherein said lines from the second transducer intersect different radii of the disc at a substantially different angle from the angle of intersection of a corresponding line of the first transducer with a radii.

43. The apparatus of claim 42 wherein the progress path of the second transducer is oriented in essential alignment with the progress path of the first transducer, and wherein the first and second transducers are mounted for movement on opposite sides of the center of rotation.

44. The apparatus of claim 41 further including another transducer for recording or reproducing video signals corresponding to yet another picture onto or from said selected portion, said another transducer being of the magnetic type and having a substantially straight recording gap for recording or reading imprints representing video signals corresponding thereto in a succession of tracks about the center of rotation, the imprints of the video signals for a given picture element of said another picture being merged from track to track to form a continuous line which is at a substantial angle to corresponding imprint lines from any other transducer, and means for moving said another transducer along a progress path different from the progress path of any other transducer.

45. The apparatus of claim 44 wherein the gap of each transducer is oriented in alignment with the progress path of that transducer.

46. The apparatus of claim 44 wherein the imprint lines corresponding to said another transducer extend generally along corresponding radii of the disc.

47. The apparatus of claim 46 wherein the progress path of said another transducer is aligned with a line through the center of rotation.

48. Apparatus for recording a time changing picture on a record medium wherein the picture is formed of frames and each frame is formed of scan lines, the apparatus comprising:

a magnetic transducer;

means coupled to the transducer for applying video signals to be recorded on the record medium;

means for supporting the record medium adjacent the transducer;

means for developing relative rotation between the transducer and the record medium about a center of rotation;

means for energizing the transducer to record a series of imprints corresponding to the applied video signals in successive concentric tracks on the record medium;

means for developing relative movement between the transducer and the record medium such that the imprints from track to track are merged to form a pattern of continuous straight lines corresponding respectively to picture elements having a fixed display position from frame to frame, the lines forming a substantial angle to the direction of the tracks and intersecting different radii of the center of rotation.

49. The apparatus of claim 48 wherein the means for developing relative rotation comprises means for rotating a magnetic disc about a central axis, and wherein the means for developing relative movement of the transducer comprises means for moving the transducer along a straight line progress path.

50. The apparatus of claim 49 wherein the magnetic transducer includes a gap oriented in alignment with the progress path.

51. The apparatus of claim 48 further comprising a second magnetic transducer, means for applying video signals corresponding to a second time changing picture to the second transducer for recording a series of second imprints in a plurality of side-by-side tracks, the imprints corresponding to picture elements having a fixed display position from frame to frame, and means for developing relative movement between the second transducer and the record medium to record the second imprints in a pattern of straight lines merged from track to track, said second imprints being oriented at a substantial angle both with respect to the first-mentioned imprints and said tracks.

52. The apparatus of claim 51 wherein the means for developing relative movement of the second transducer comprises means for moving the second transducer in a straight line progress path different from the path of the first-mentioned transducer.

53. The apparatus of claim 52 wherein the second transducer includes a gap oriented in alignment with the progress path of the second transducer.

54. The apparatus of claim 53 wherein the gaps of the two transducers are oriented non-radially relative to the center of rotation of the record medium.

* * * * *